United States Patent
Reddy et al.

(10) Patent No.: US 12,273,912 B2
(45) Date of Patent: *Apr. 8, 2025

(54) STATUS MESSAGING PROTOCOL

(71) Applicant: AltioStar Networks, Inc., Tewksbury, MA (US)

(72) Inventors: M Ramana Reddy, Andhra Pradesh (IN); Sankarshan Sen, Karnataka (IN); Parvez Munir Khan, Andover, MA (US)

(73) Assignee: Altiostar Networks, Inc., Tewksbury, MA (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/676,967

(22) Filed: Feb. 22, 2022

(65) Prior Publication Data

US 2022/0287078 A1    Sep. 8, 2022

Related U.S. Application Data

(63) Continuation of application No. 16/781,833, filed on Feb. 4, 2020, now Pat. No. 11,343,846.

(51) Int. Cl.
| | |
|---|---|
| *H04W 74/00* | (2009.01) |
| *H04L 27/26* | (2006.01) |
| *H04W 36/00* | (2009.01) |

(52) U.S. Cl.
CPC ....... *H04W 74/002* (2013.01); *H04L 27/2666* (2013.01); *H04L 27/2671* (2013.01); *H04W 36/0033* (2013.01); *H04W 36/0064* (2023.05)

(58) Field of Classification Search
None
See application file for complete search history.

(56) References Cited

U.S. PATENT DOCUMENTS

| | | | |
|---|---|---|---|
| 7,954,109 B1 * | 5/2011 | Durham | H04L 43/18 709/224 |
| 9,801,149 B2 * | 10/2017 | Ohta | H04W 36/0058 |
| 11,005,585 B1 | 5/2021 | Gopalakrishnan et al. | |
| 2005/0043059 A1 * | 2/2005 | Petite | H02J 13/00022 455/557 |

(Continued)

FOREIGN PATENT DOCUMENTS

| | | | |
|---|---|---|---|
| CN | 110505157 A | 11/2019 | |
| EP | 1427121 A1 * | 6/2004 | ............ H04J 3/0658 |
| JP | 2018-37958 A | 3/2018 | |

OTHER PUBLICATIONS

International Search Report and Written Opinion received for International Patent Application PCT/US2021/016417 filed on Feb. 3, 2021, mailed on May 25, 2021, 12 pages.

(Continued)

*Primary Examiner* — Lonnie V Sweet
(74) *Attorney, Agent, or Firm* — Sughrue Mion, PLLC

(57) ABSTRACT

A method, an apparatus, a system, and a computer program product for radio synchronous status messaging between communications units in wireless communications systems. A change of status event by one or more first communications devices is detected. A message indicative of the detected change of status event is generated. The generated message is transmitted to one or more second communications devices.

22 Claims, 17 Drawing Sheets

(56) References Cited

U.S. PATENT DOCUMENTS

| | | | |
|---|---|---|---|
| 2008/0075126 A1* | 3/2008 | Yang | H04L 69/28 370/469 |
| 2011/0261917 A1 | 10/2011 | Bedrosian | |
| 2014/0028436 A1* | 1/2014 | Osako | G08C 19/00 340/3.2 |
| 2014/0192797 A1 | 7/2014 | Licardie et al. | |
| 2014/0337477 A1* | 11/2014 | Fisher | G06F 18/21 709/219 |
| 2015/0295699 A1* | 10/2015 | Joung | H04L 27/26 370/278 |
| 2016/0170440 A1* | 6/2016 | Aweya | G06F 1/10 713/503 |
| 2018/0206178 A1 | 7/2018 | Tenny et al. | |
| 2018/0206203 A1 | 7/2018 | Ruffini et al. | |
| 2018/0270773 A1* | 9/2018 | Lee | H04W 56/0015 |
| 2019/0191398 A1 | 6/2019 | Ruffini et al. | |
| 2019/0327320 A1 | 10/2019 | Rubin et al. | |
| 2020/0413331 A1 | 12/2020 | Sandgren et al. | |

OTHER PUBLICATIONS

Office Action issued Oct. 3, 2023 in Japanese Application No. 2022-547238.

* cited by examiner

STATUS MESSAGING PROTOCOL

CROSS-REFERENCE TO RELATED APPLICATIONS

The present application claims priority to and is a continuation of U.S. patent application Ser. No. 16/781,833 to M Ramana Reddy, et al., filed on Feb. 4, 2020, entitled "Status Messaging Protocol", and incorporates its disclosure herein by reference in its entirety.

TECHNICAL FIELD

In some implementations, the current subject matter relates to telecommunications systems, and in particular, to radio synchronous status messaging protocol between various communications units (e.g., distributed unit, radio unit, etc.) in wireless communications systems, such as, for example, 5G New Radio ("NR").

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if when mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G LTE standard is currently being developed and deployed. LTE is based on the GSM/EDGE and UMTS/HSPA digital cellular technologies and allows for increasing capacity and speed by using a different radio interface together with core network improvements.

Mobile devices are used for receiving and transmitting of various types of data, such as, voice data (e.g., telephone calls), emails, text messages, Internet browsing, video data (e.g., videos, video calling, augmented/virtual reality, etc.), audio data (e.g., streaming of songs), etc. Different types of data can require different transmission bandwidth. For example, in order to reproduce a high-definition video on a mobile device having a good quality, a higher bandwidth may be required as compared to transmission of an email or a text message to the mobile device.

To ensure proper efficient and proper functioning of the air interface, 5G NR networks implement various frequency and timing requirements. However, currently implemented protocols are not capable of providing effective synchronization of timing to base stations.

SUMMARY

In some implementations, the current subject matter relates to a computer implemented method for radio synchronous status messaging between communications units in wireless communications systems. The method can include detecting a change of status event by one or more first communications devices, generating a message indicative of the detected change of status event, and transmitting the generated message to one or more second communications devices.

In some implementations, the current subject matter can include one or more of the following optional features. The communications devices can include at least one of the following: a base station, a gNodeB base station, an eNodeB base station, and any combination thereof. In particular, the communications devices can include at least one of the following: one or more distributed units, one or more radio units, and any combinations thereof. Further, in some implementations, the remote units can generate the message and transmit the generated message to the one or more distributed units. Alternatively, or in addition to, the distributed units can generate the message and transmit the generated message to the one or more remote units.

In some implementations, the message can be a Layer 2 message frame configured to be transmitted from one or more Layer 2 components of the one or more first communications devices to one or more Layer 2 components of the one or more second communications devices. The Layer 2 message can include at least one of the following: an identification of a source of the Layer 2 message, an identification of a type of the source of the Layer 2 message, an identification of a destination of the Layer 2 message, an identification of a type of the destination of the Layer 2 message, an identification of a type of the Layer 2 message, a data corresponding to the change of status event, and any combination thereof. Further, the data corresponding to the change of status event can include at least one of the following: a precision timing protocol clock status, a synchronous Ethernet clock status, a time error status, a precision timing protocol configuration, a synchronous Ethernet configuration, one or more commands, one or more configurations, and any combination thereof. The data corresponding to the change of status event can include at least one of the following: a time elapsed since a detection of a previous change of status event, a phase offset configuration, a frequency offset configuration, and any combination thereof.

In some implementations, the method can include executing, by the second communications devices, one or more actions based on the received message.

In some implementations, the message can be a multicast message configured to be received by the one or more second communication devices in substantially real time.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1B illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

DETAILED DESCRIPTION

The current subject matter can provide for systems and methods that can be implemented in lower layer split architecture for wireless communications systems. Such systems can include various wireless communications systems, including 5G New Radio communications systems, long term evolution communication systems, etc.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1A:
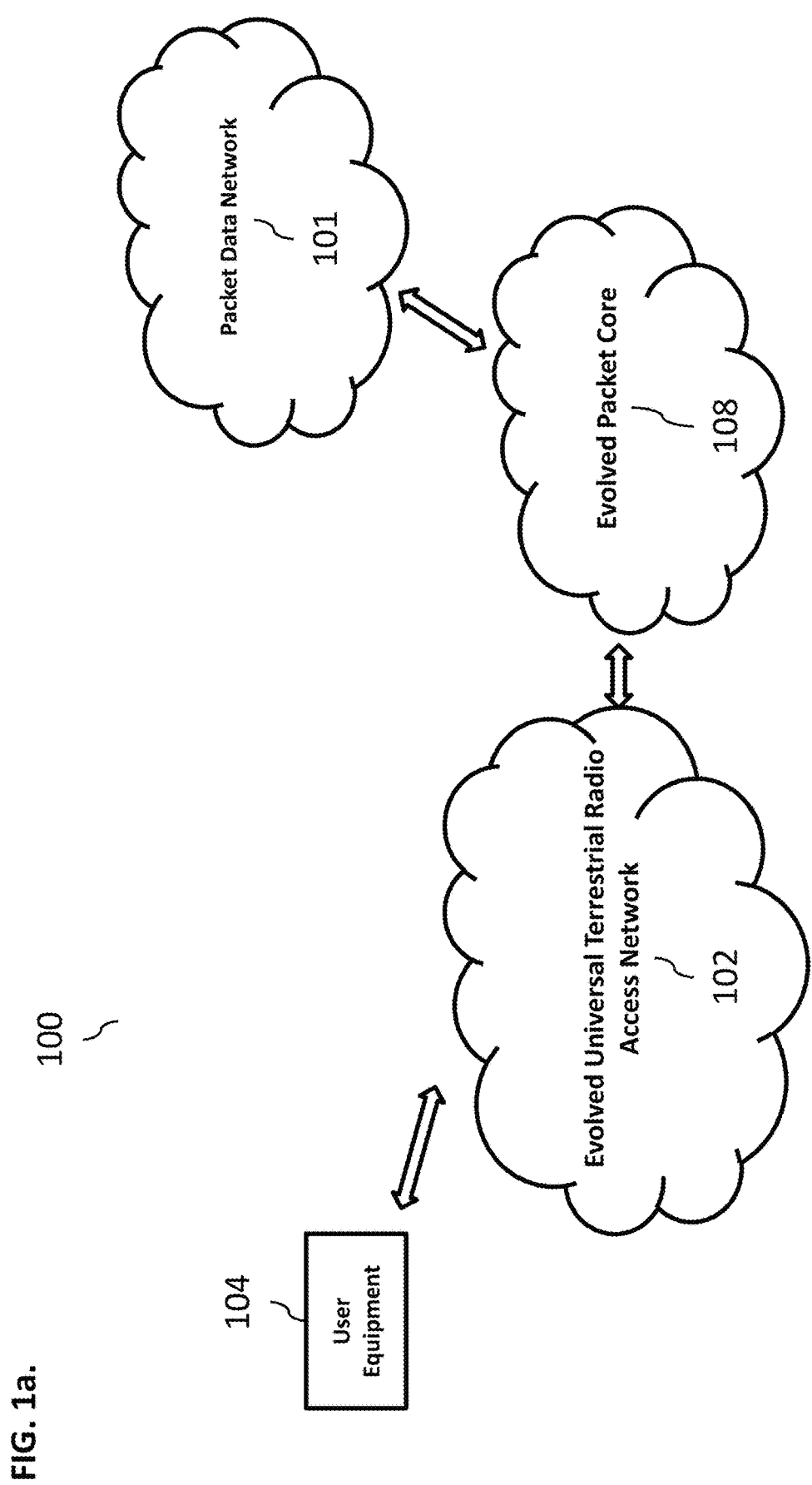
FIG. 1a illustrates an exemplary conventional long term evolution ("LTE") communications system.
Figure 1B:
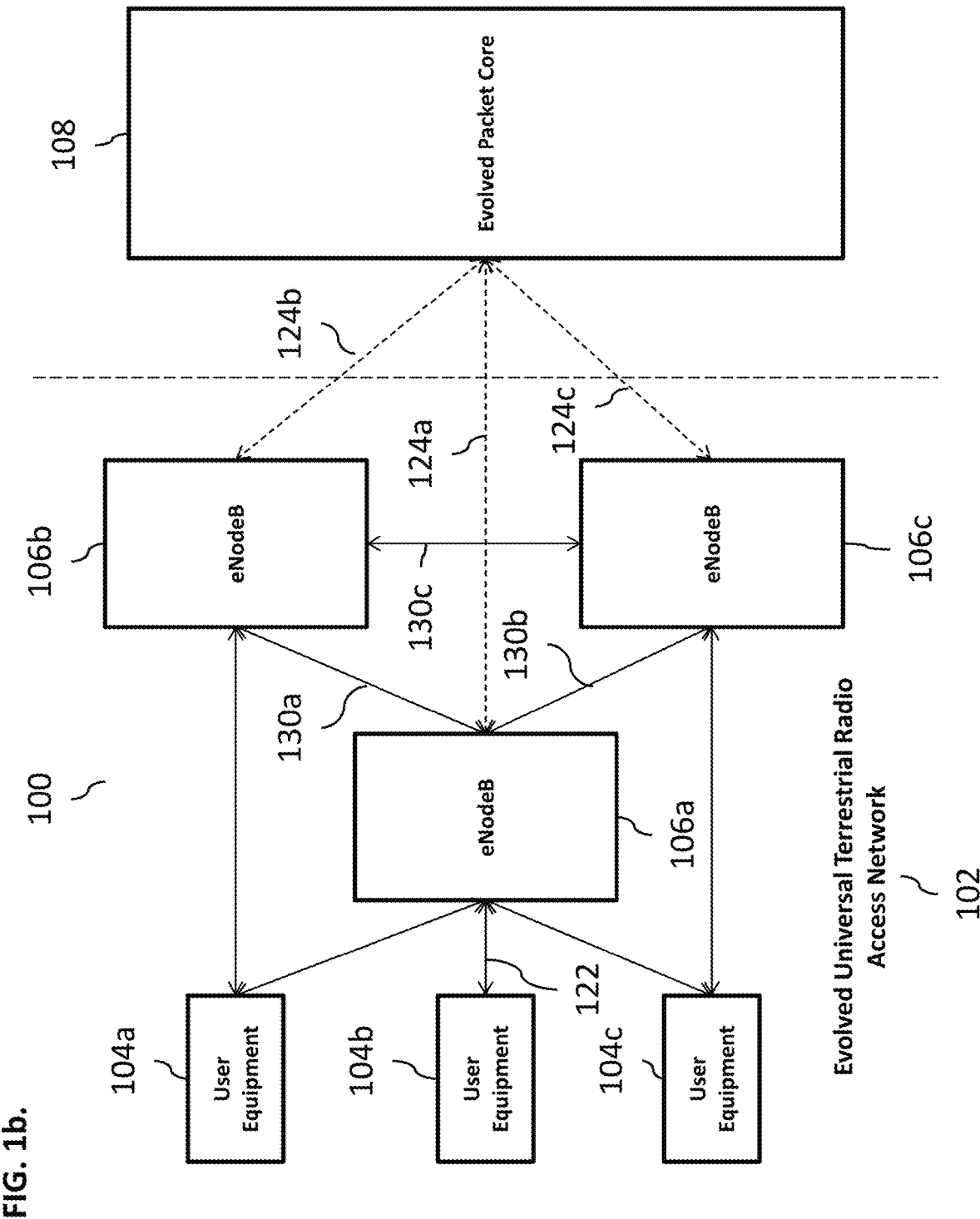

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1B) that provide communication capabilities to a plurality of user equipment 104 (a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
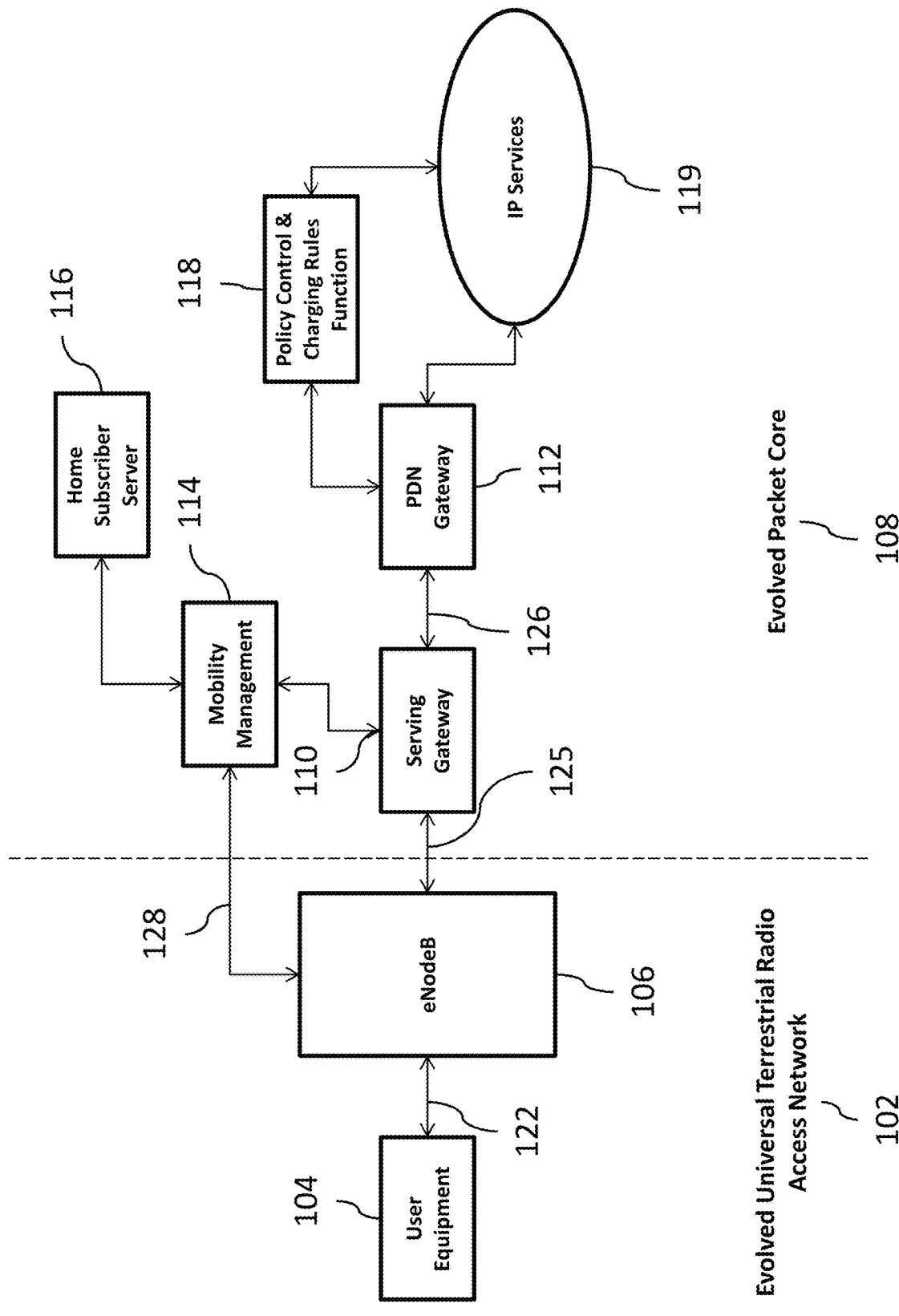

FIG. 1B illustrates further detail of the network 100 shown in FIG. 1*a*. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMES, as shown in FIG. 1*c*) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1B, the air interface 122 provides communication between user equipment 104*b* and the eNodeB 106*a*. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1*c*). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130 (*a, b, c*). As shown in FIG. 1*a*, X2 interface 130*a* provides interconnection between eNodeB 106*a* and eNodeB 106*b*; X2 interface 130*b* provides interconnection between eNodeB 106*a* and eNodeB 106*c*; and X2 interface 130*c* provides interconnection between eNodeB 106*b* and eNodeB 106*c*. The X2 interface can be established between two eNodeBs in order to provide an exchange of signals, which can include a load- or interference-related information as well as handover-related information. The eNodeBs 106 communicate with the evolved packet core 108 via an S1 interface 124 (*a, b, c*). The S1 interface 124 can be split into two interfaces: one for the control plane (shown as control plane interface (S1-MME interface) 128 in FIG. 1*c*) and the other for the user plane (shown as user plane interface (S1-U interface) 125 in FIG. 1*c*).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1*c*. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1*a*). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1*a*).

Figure 1D:
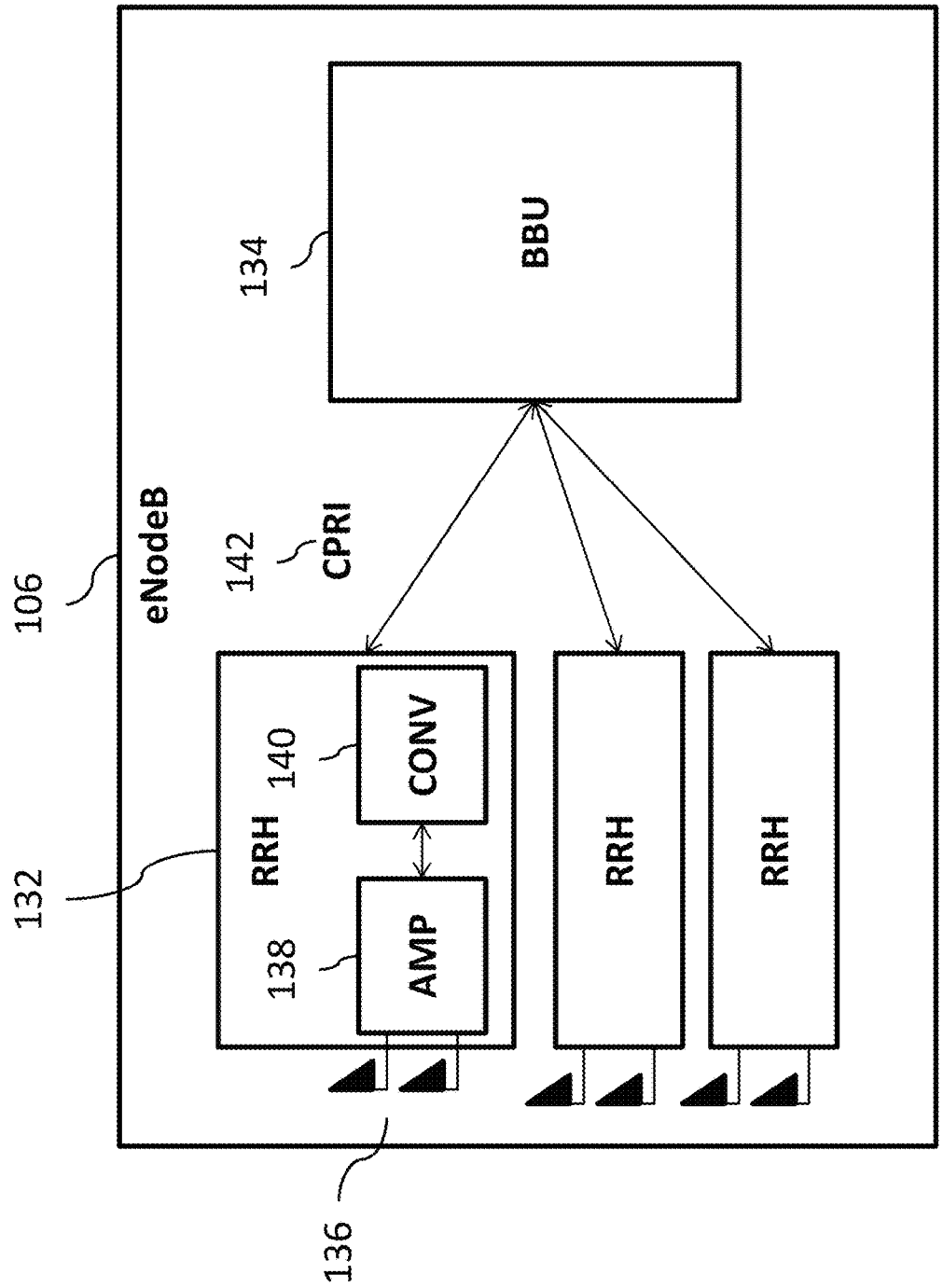

FIG. 1*d* illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using the following standard parameters (and specifications): radio frequency band (Band4, Band9, Band17), bandwidth (5, 10, 15, 20 MHz), access scheme (downlink: OFDMA; uplink: SC-OFDMA), antenna technology (downlink: 2×2 MIMO; uplink: 1×2 single input multiple output ("SIMO")), number of sectors (6 maximum), maximum transmission power (60 W), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
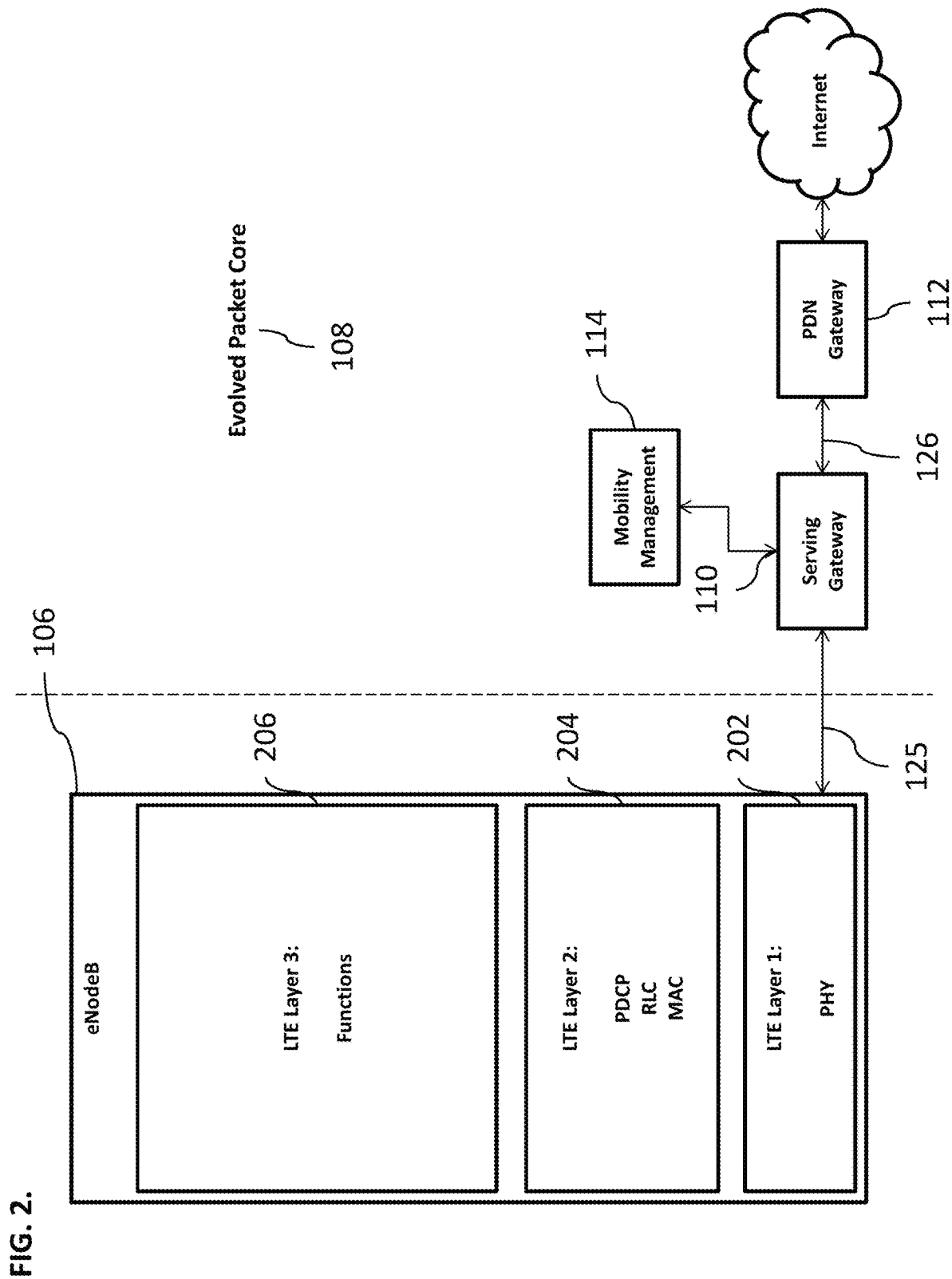
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMES and S-GWs. The eNodeB 106 selects an MME from a group of MMES so the load can be shared by multiple MMES to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when not Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
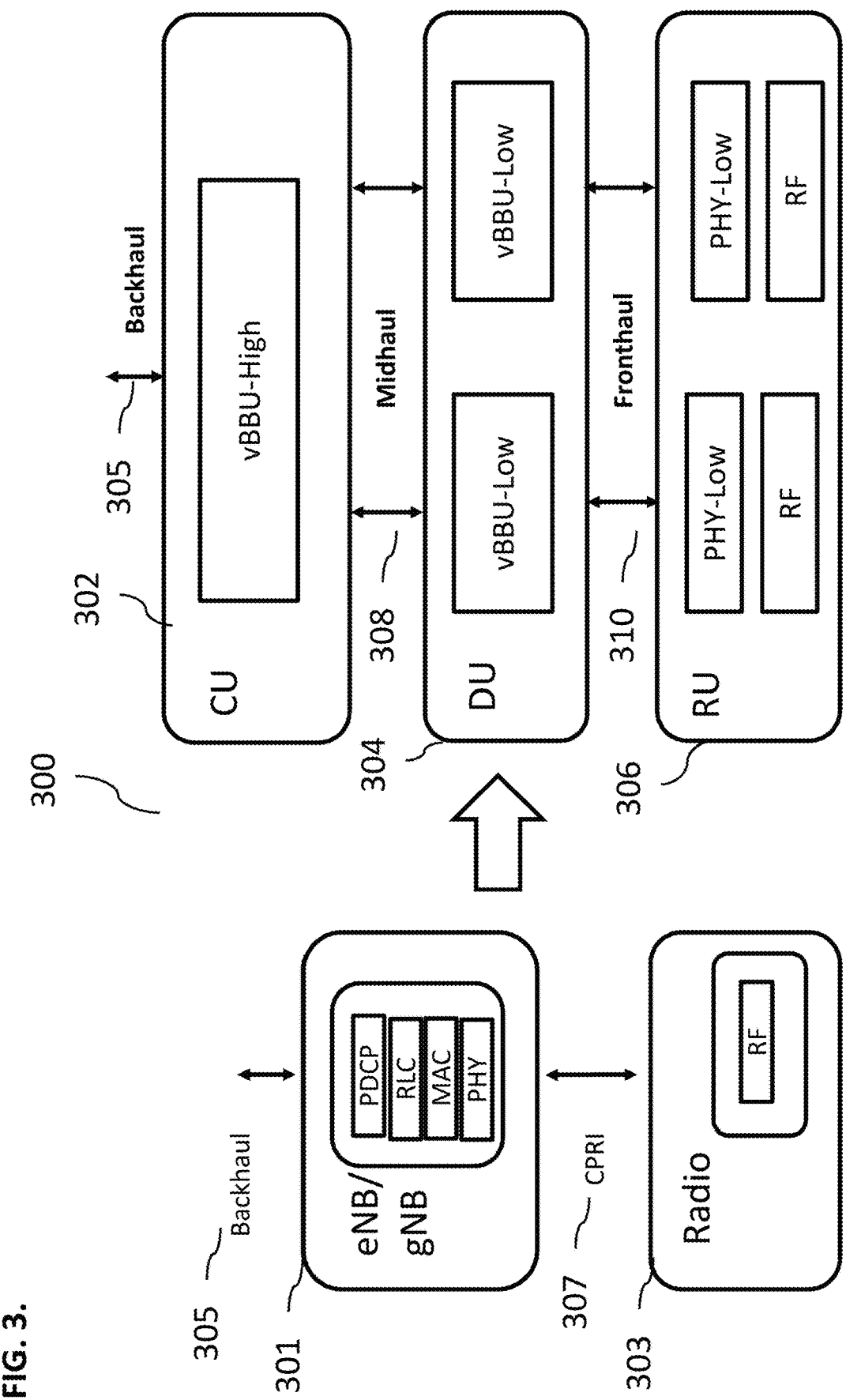
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 307, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 308. The units 302, 304 can include one or more base stations, macro base stations, micro base stations, remote radio heads, etc. and/or any combination thereof.

In lower layer split architecture environment, a CPRI bandwidth requirement for NR can be 100s of Gb/s. CPRI compression can be implemented in the DU and RU (as shown in FIG. 3). In 5G communications systems, compressed CPRI over Ethernet frame is referred to as eCPRI and is the recommended fronthaul interface. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

Figure 4:
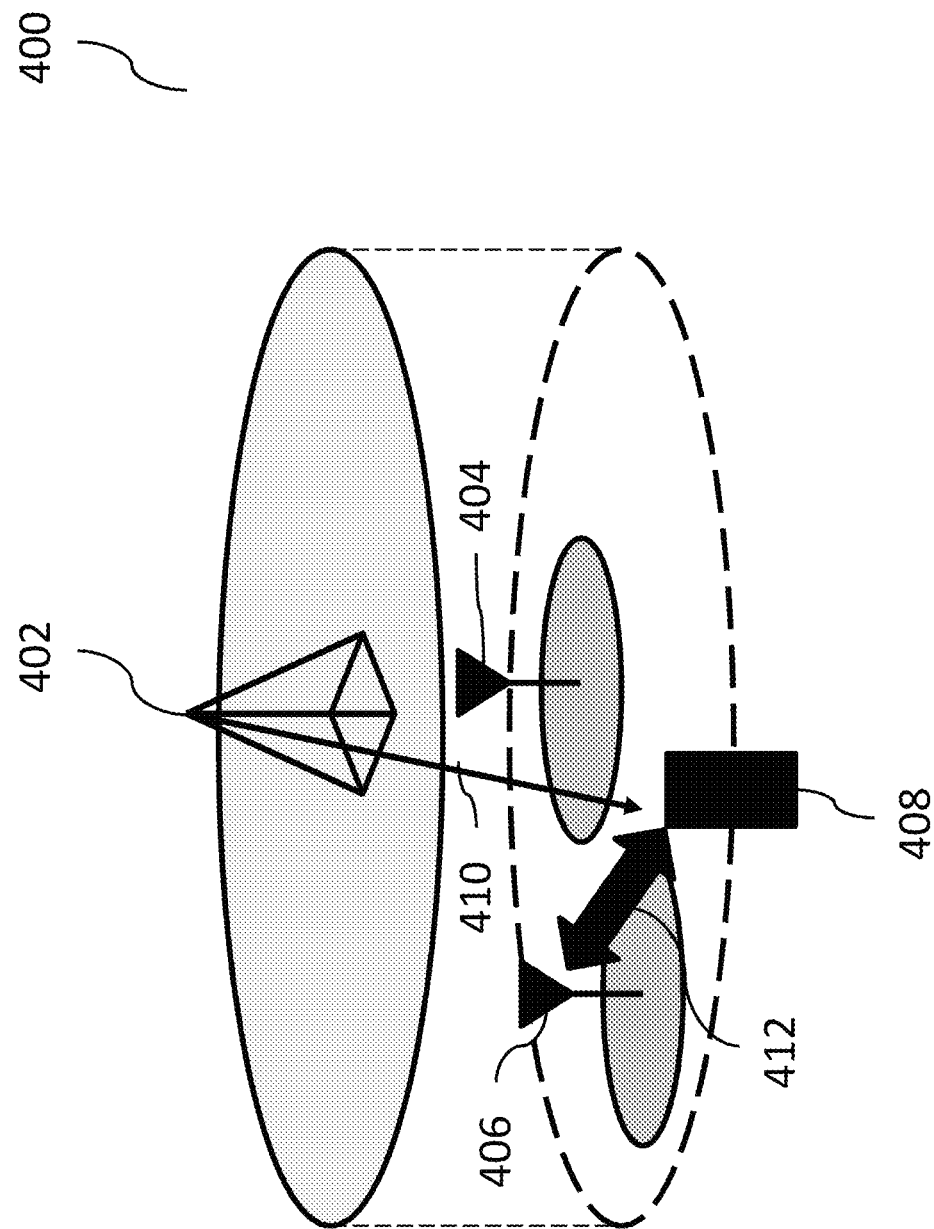
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404 and 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 402, 404 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE PUCCH and NR PUCCH can be transmitted on the same frequency.

Figure 5:
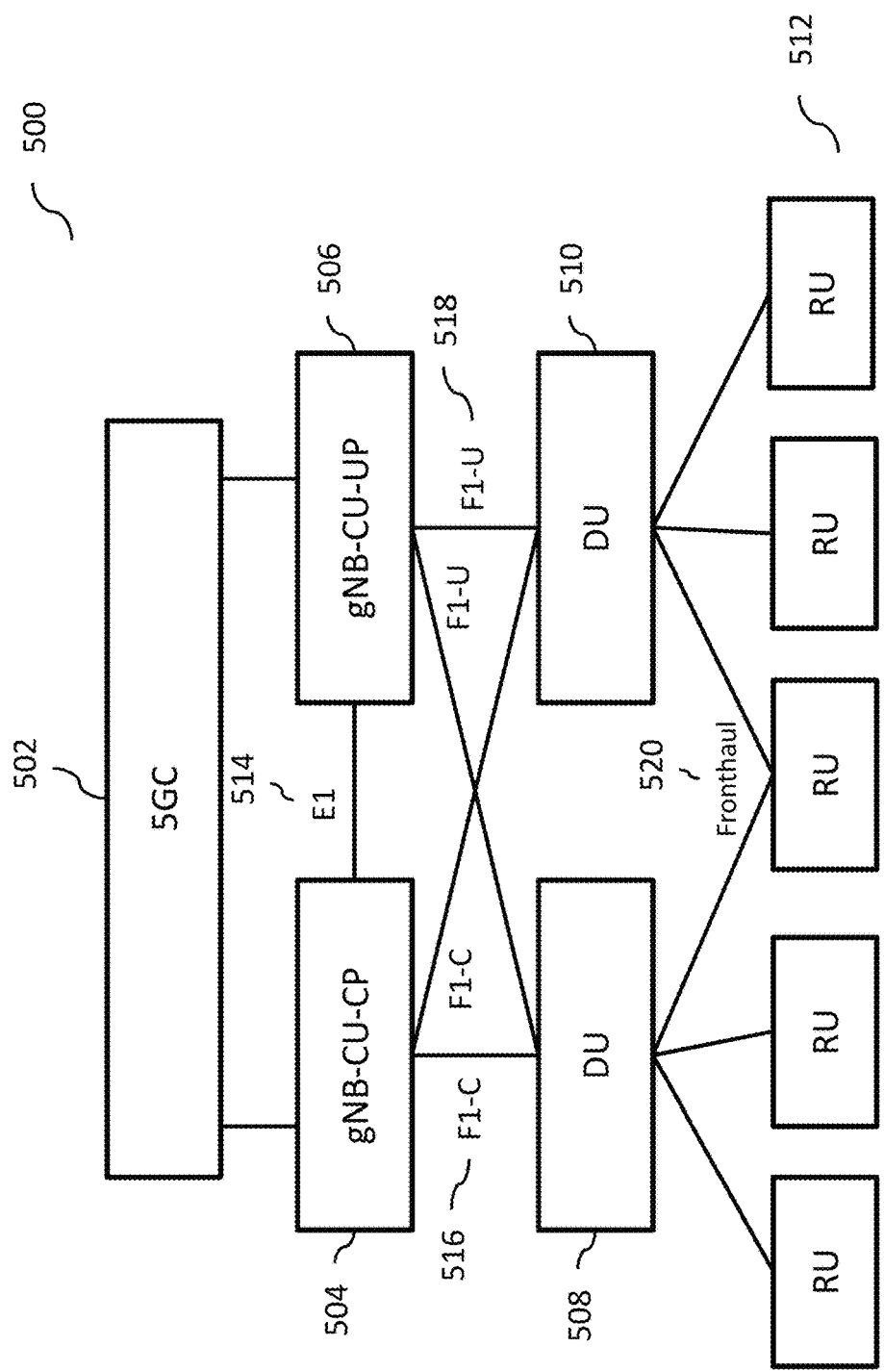
FIG. 5 illustrates an exemplary 5G wireless communication system.

FIG. 5 illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs may have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 may be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the lower layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul interface 520, which in turn communicate with one or more user equipment (not shown in FIG. 5). The remote radio units 512 can be configured to execute a lower part of the PHY layer protocols as well as provide antenna capabilities to the remote units for communication with user equipments (similar to the discussion above in connection with FIGS. 1a-2).

Figure 6:
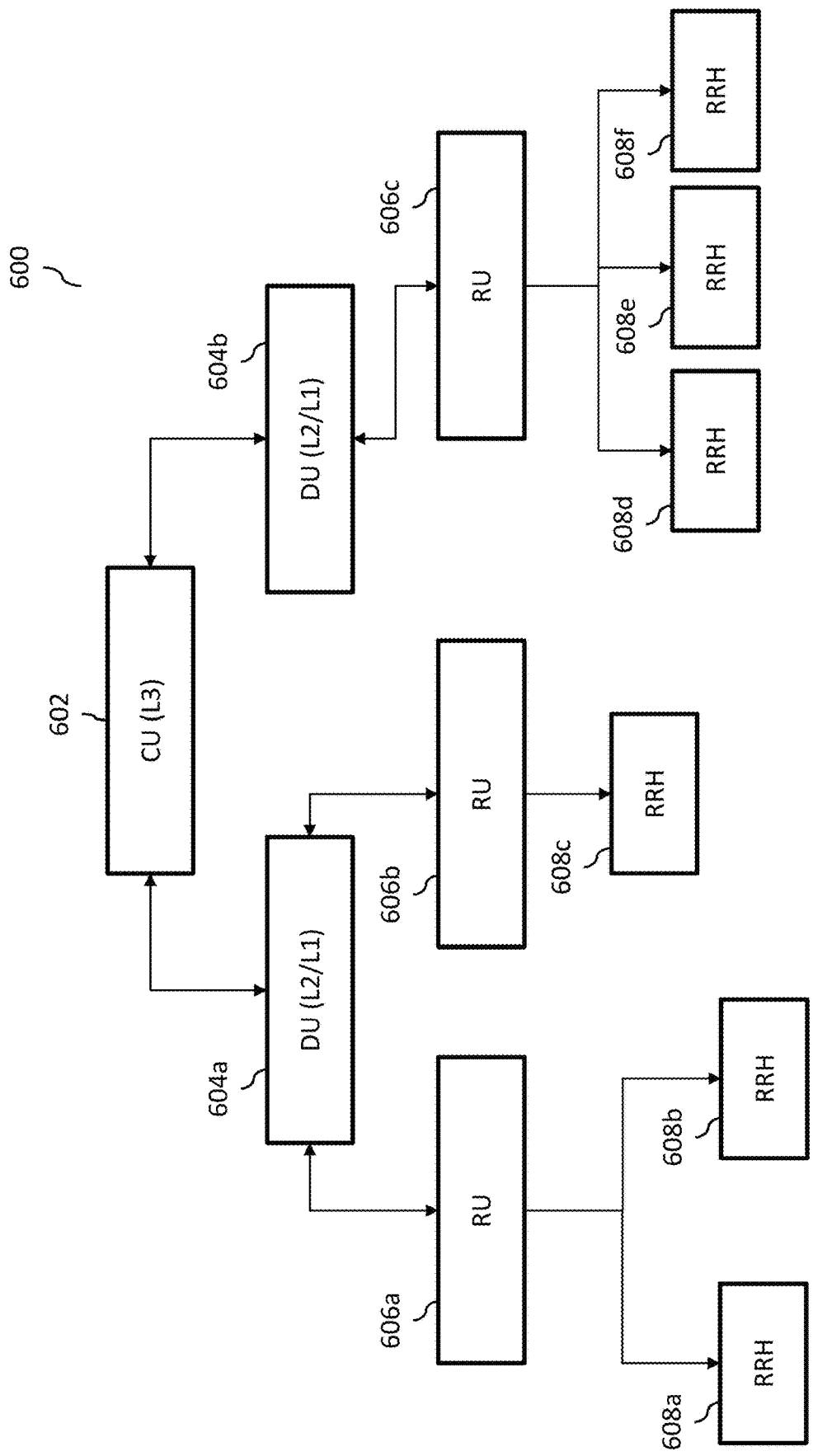
FIG. 6 illustrates a 5G wireless communication system, according to some implementations of the current subject matter.

FIG. 6 illustrates a 5G wireless communication system 600, according to some implementations of the current subject matter. The system 600 can be part of the system 500 shown in FIG. 5. The system 600 can be configured to include one or more centralized units (CU) 602, one or more distributed units (DU) 604 (a, b), one or more radio units (RU) 606 (a, b, c), and one or more remote radio heads (RRH) 608 (a, b, c, d, e, f). The units 602-608 can be communicatively coupled using one or more interfaces discussed above.

In some implementations, the CU 602 can be communicatively coupled to DU 604a and DU 604b. In turn, the distributed unit 604a can be communicatively coupled to the remote units 606a and 606b, whereby unit 606a can be coupled to two remote radio heads 608a and 608b and unit 606b can be coupled to one remote radio head 608c. The distributed unit 604b can be coupled to the remote unit 606c, which is in turn, coupled to three remote radio heads 608d, 608e, and 608e. The system 600 shown in FIG. 6 may be configured as a virtualized disaggregated radio access network (RAN) architecture, whereby layers L1, L2, L3 and radio processing can be virtualized and disaggregated in the centralized unit(s), distributed unit(s) and radio unit(s).

Figure 7A:
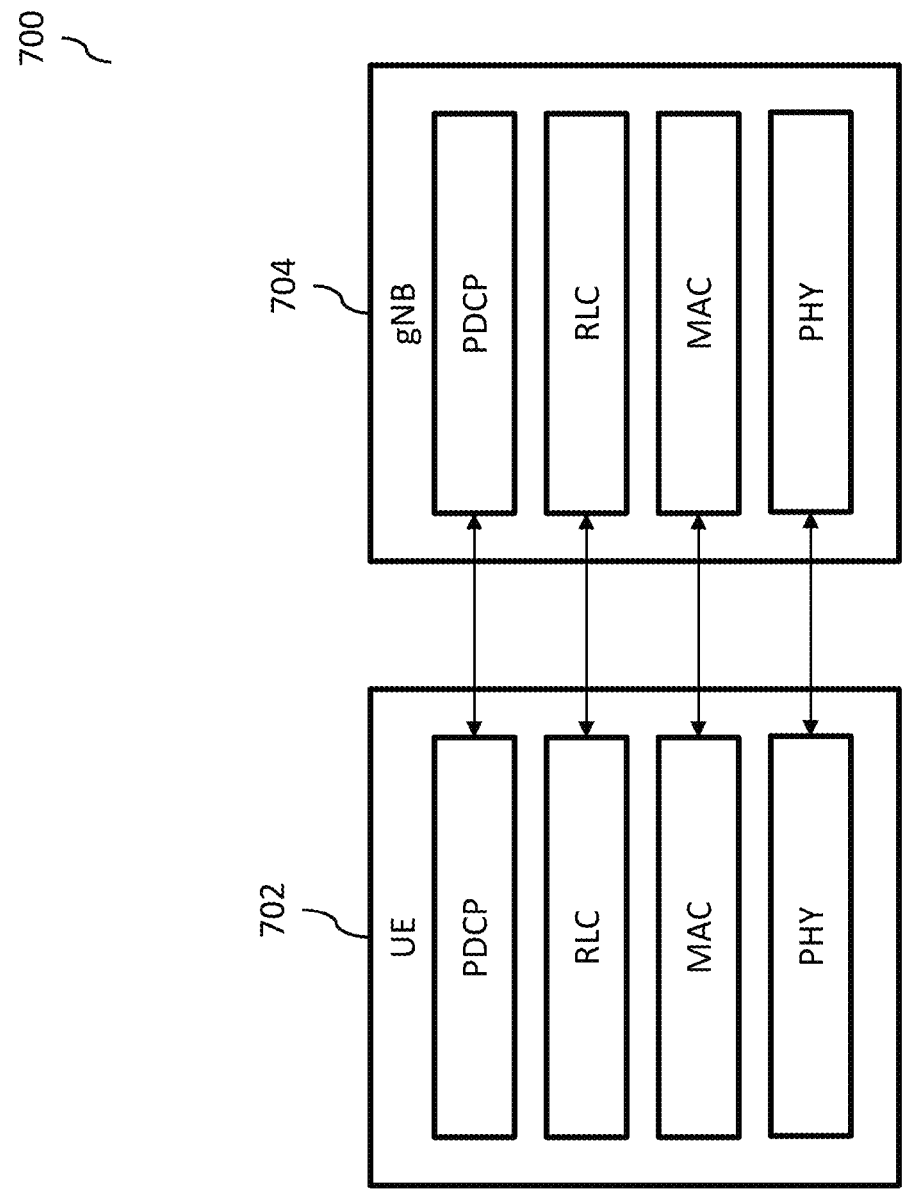
FIG. 7a illustrates a user plane protocol stack.
Figure 7B:
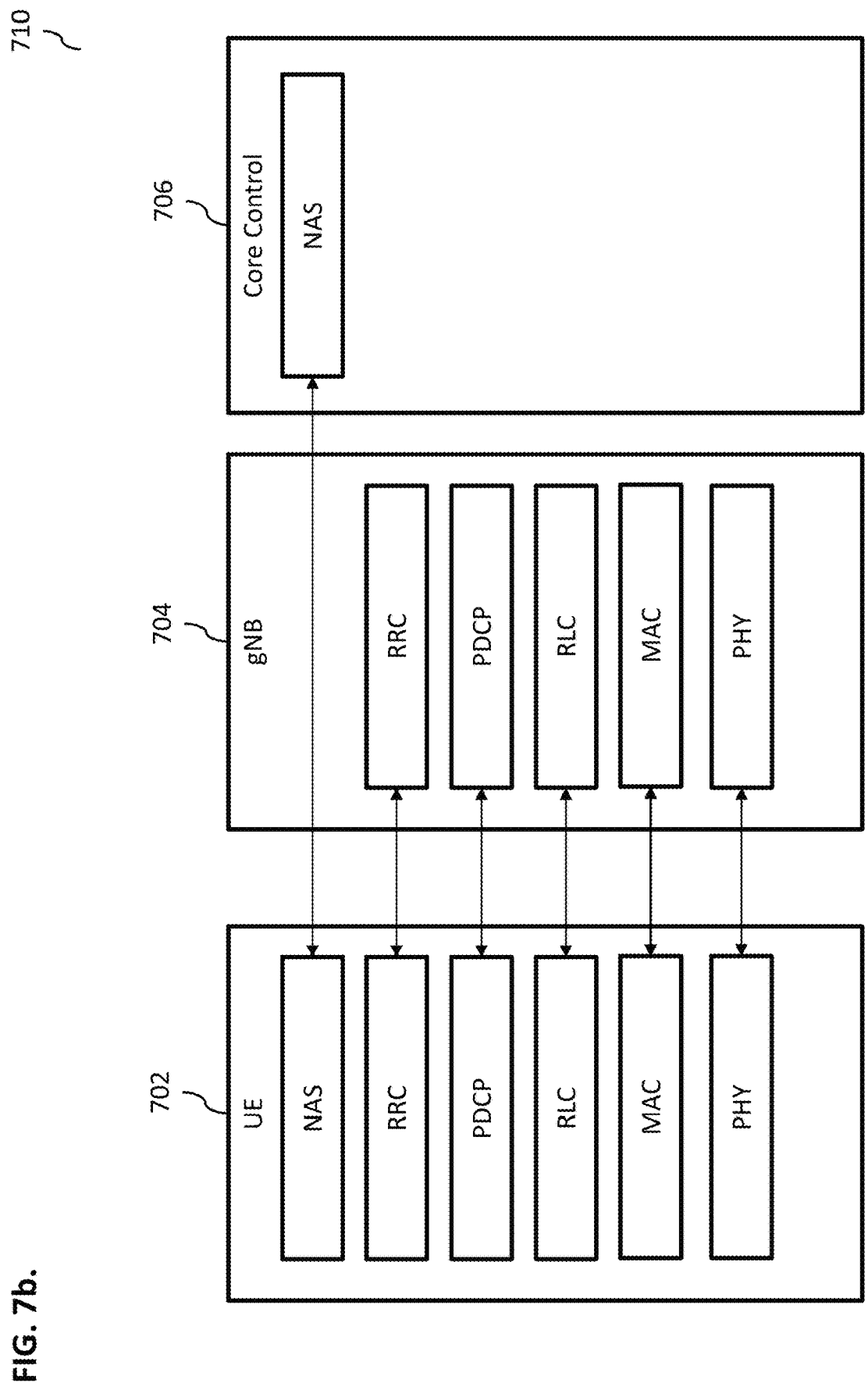
FIG. 7b illustrates a control plane protocol stack.

FIGS. 7a-b illustrate further details of an exemplary protocol stack in a 5G wireless communication system. In particular, FIG. 7a illustrates a user plane protocol stack 700 and FIG. 7b illustrates a control plane protocol stack 710. Portions of the protocol stack are illustrated for both an exemplary user equipment 702 and a base station (or portion thereof), e.g., gNodeB or gNB, 704. The user plane protocol stack 700 can include PHY, MAC, RLC and PDCP layers. The control plane protocol stack 710 can include PHY, MAC, RLC, PDCP, RRC, as well as a NAS (non-access stratum, a portion of which may be incorporated into a 5G core control network 706, as shown in FIG. 7b).

The protocol stack can include layer 1, layer 2 and layer 3. Layer 1 is PHYSICAL (PHY) layer. Layer 2 can include MAC, RLC and PDCP. Layer 3 is RRC layer as shown in FIGS. 7a-b.

Some of the functions of the PHY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer may be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Messaging Protocol

In some implementations, the current subject matter can be configured to provide a real-time messaging communication protocol system between DU and RU, as for example, related to frequency, timing synchronization, etc. events, to ensure that the communication system 600 shown in FIG. 6 operates efficiently and effectively. Such timing and synchronization protocol system can be configured to operate with a variety of deployment models, where multiple DUs communicate with a single RU, multiple RUs communicate with single DU, and the DUs control and/or monitor connected RUs to enable/disable various radio frequency (RF) features within RU. To ensure that appropriate controls of features and capabilities are executed by the DU, the DU can be configured to obtain real-time timing, synchronization, etc. status information from the RU. The real-time frequency and timing information can allow a base station to maximize data rates (e.g., by minimizing guard frequencies/times in order to maximize spectral efficiency, utilizing bandwidth-boosting technologies as Carrier Aggregation (CA) and MIMO/CoMP) as well as optimize user experience (e.g., by executing smooth handover, reducing delay, providing location-based services (LBS), etc.). Moreover, the RU can be configured to react to real-time timing, synchronization, etc. state changes and provide/update the real-time status to DU. This can allow DU to execute various decisions concerning RU functionalit(ies), including, as stated above, but not limited to, enabling/disabling certain RF features based on a type of time, synchronization/etc. status events/changes reported by RU.

In some implementations, the current subject matter can be further configured to communicate timing/synchronization/etc. state change events/changes of the RU to the DU over an Ethernet layer (e.g., precision time protocol (PTP) lock status, clock quality changes, phase/frequency accuracy updates, etc.). Further, the DU can be configured to communicate various configuration/monitoring/etc. information to RU in order to determine which features of the RU are to be enabled/disabled. In some exemplary implementations, this information/messages between the DU and RU can use a radio synchronous status messaging (RSSM) protocol, as described herein.

Figure 8:
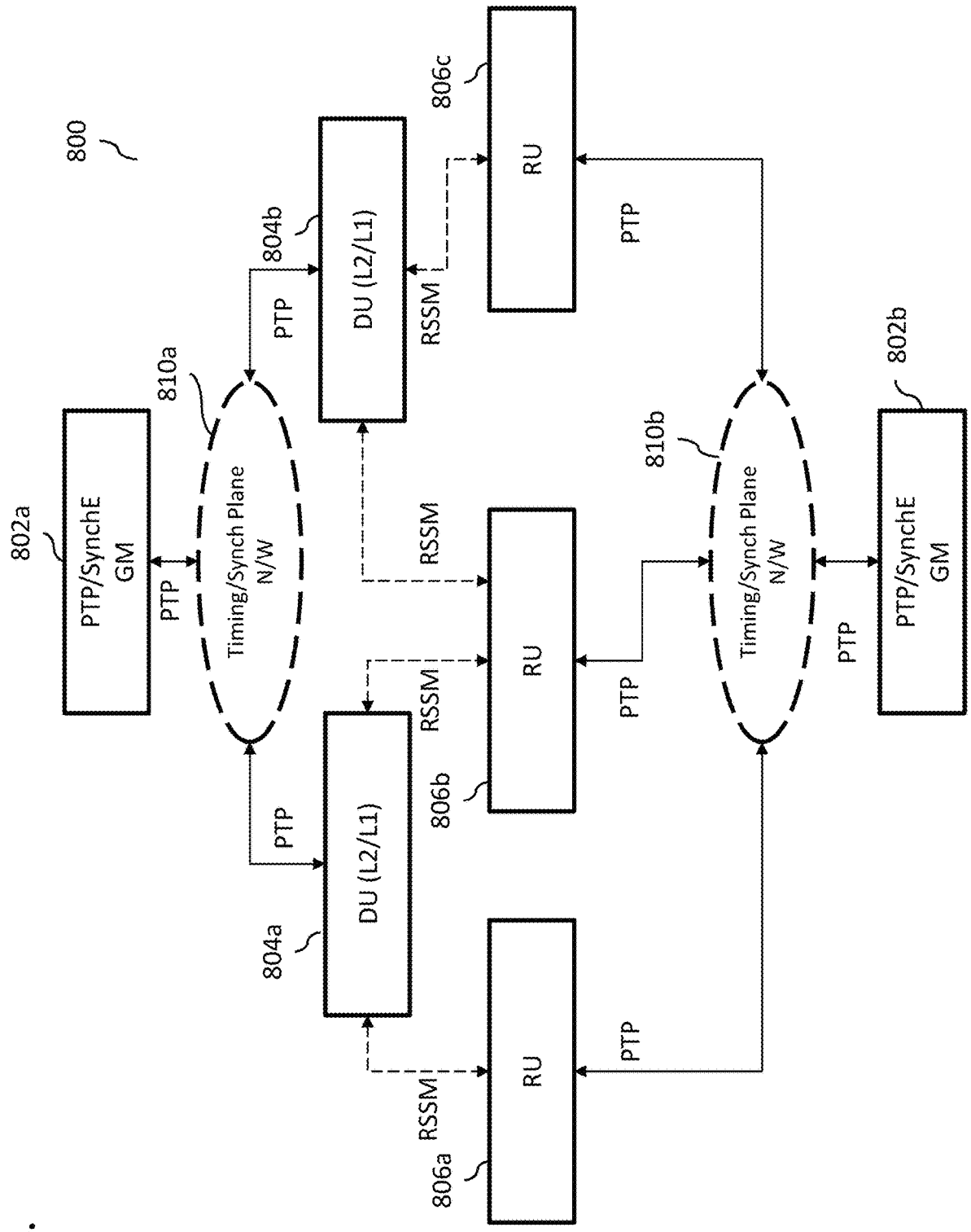
FIG. 8 illustrates an exemplary radio synchronous status messaging protocol system, according to some implementations of the current subject matter.

FIG. 8 illustrates an exemplary radio synchronous status messaging protocol system 800, according to some implementations of the current subject matter. The system 800 can be part of a 5G wireless communications system. The system 800 can include one or more distributed units (DU) 804 (a, b) communicatively coupled to one or more remote units (RU) 806 (a, b, c). As shown in FIG. 8, the DU 804a can be communicatively coupled to RUs 806a and 806b. The DU 804b can be communicatively coupled to RUs 806b and 806c. The system 800 can also include one or more synchronization masters that can be selected for each of the network segments in the system, where a root timing reference is referred to as a grandmaster (e.g., GMs 802a, 802b). The grandmaster can transmit synchronization information to the clocks residing on its network segment, whereby, upon selection of a grandmaster, all other clocks can synchronize directly to it. A precision time protocol (PTP) (as originally defined in IEEE 1588-2002 standard) can be used to synchronize clocks throughout the system 800. The PTP can be used to achieve clock accuracy in a sub-microsecond range. As shown in FIG. 8, both the DUs 804 and RUs 806 can be configured to use PTP protocol for the purposes of clock synchronization (via timing/synchronization plane 810 (a, b)). However, in order to synchronize clocks as related to state changes/events, the radio synchronous status messaging protocol, as described herein, can be used between DUs 804 and RUs 806.

The use of the current subject matter communication protocol resolves various problems associated with conventional systems that implement the NETCONF/YANG protocol (or application layer mode of communication). The NETCONF/YANG is a network management protocol developed and standardized by the Internet Engineering Task Force (IETF) under RFC 4741 and RFC 6241 standards. The protocol provides mechanisms to install, manipulate, and delete configuration of network devices. However, communications based on this protocol do not define events/alerts for all timing and synchronization events/changes/states. In particular, the protocol-based communications do not define extensions for the PTP/SyncE (synchronous Ethernet) information exchange, e.g., PTP clock class changes, SyncE clock quality changes, phase/frequency offsets, grandmaster information to which RU may be locked, mode in which RU is operating (e.g., GPS, PTP, etc.), etc. as viewed from the RU's perspective. From the DU perspective, the protocol does not define extensions for various timing and synchronization configurations, including, but not limited to, phase/frequency offset thresholds to be programmed on RU, PTP clock class/SyncE clock quality thresholds to be programmed, etc.

Figure 9:
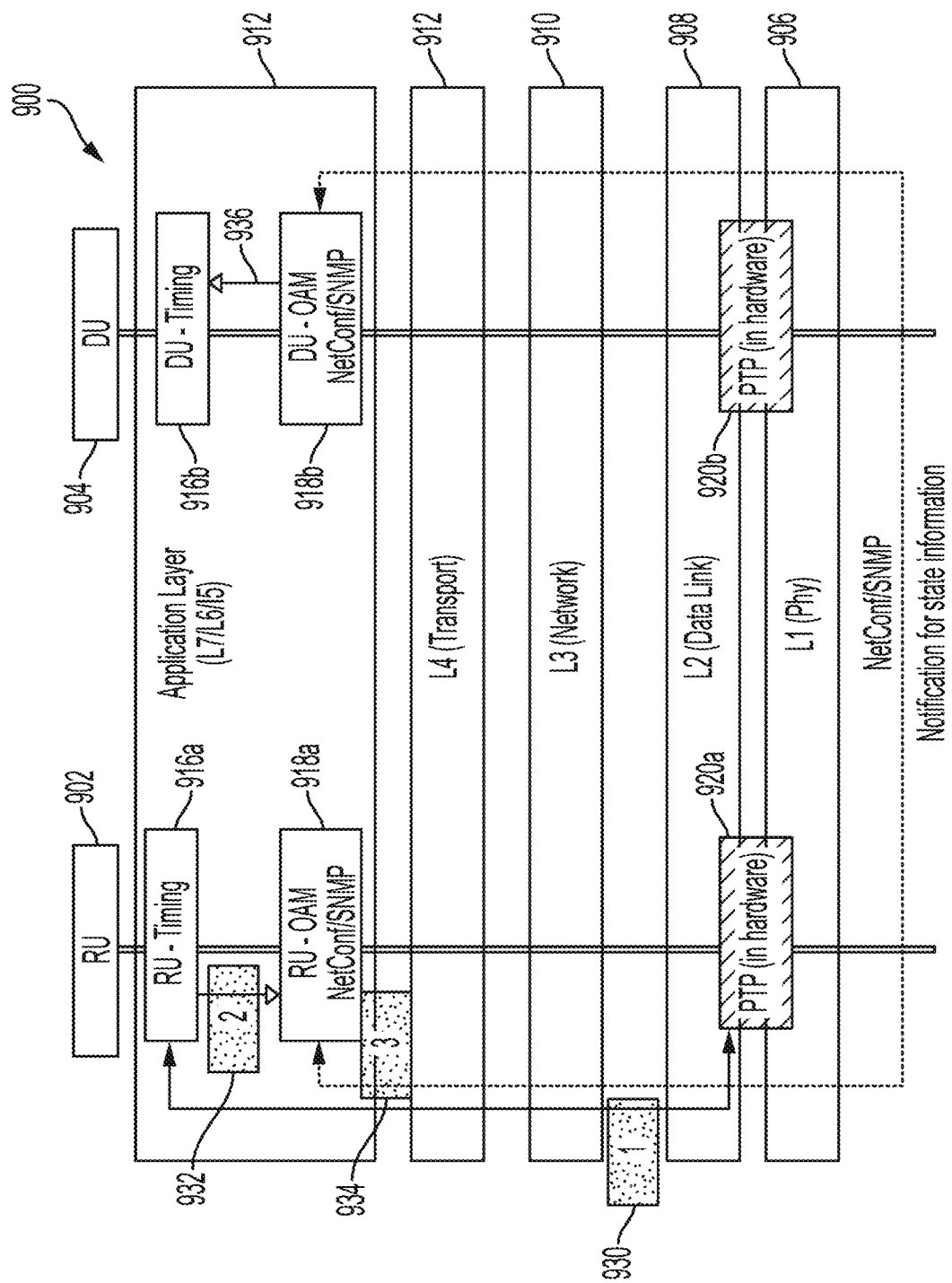
FIG. 9 illustrates an exemplary communications system that can be configured to implement the NETCONF/YANG notification protocol.

FIG. 9 illustrates an exemplary communications system 900 that can be configured to implement the NETCONF/YANG notification protocol. The system 900 can include a remote unit (RU) 902 and a distributed unit (DU) 904. Communication between RU 902 and DU 904 can be accomplished using various layers, each responsible for various aspects of the communication. In particular, the layers include Layer 1 (PHY) 906, Layer 2 (data link) 908, Layer 3 (network) 910, Layer 4 (transport) 912, and an application layer (e.g., Layers 5-7).

The application layer 914 can be configured to incorporate timing/synchronization components 916, where the RU 902 can include its own timing/synchronization component 916a and the DU 904—corresponding component 916b. Further, the application layer 914 can include operations, administration and management (OAM), simple network management protocol (SNMP) as well as various other aspects of NETCONF/YANG protocol, where each of the RU 902 and DU 904 can be configured to include a portion of each of these (e.g., RU 902 can include portion 918a, and DU 904 can include portion 918b). Application layer components 918a and 918b can be configured to exchange various notifications concerning state information in accordance with the NETCONF/YANG protocol. Components 916a and 916b can be configured to be communicatively coupled to the precision time protocol aware components 920a, 920b, respectively, that can be incorporated into hardware of Layer 1/Layer 2, as shown in FIG. 9.

The system 900 can be configured to operate as follows. A timing state change event 930 may be detected in the hardware component 920 (e.g., component 920a). The event's 930 information may be transmitted to the software component 916a. For example, the information may be indicative of a transition to holdover state due to clock class change event. The software component 916a may then be configured to communicate, at 932, this information to the component 918a. The component 918a may be configured to generate and transmit an OAM layer notification 934 that indicates a state change to its peer node, i.e., component 918b in the DU 904. The notification can be transmitted using the NETCONF/SNMP messages. Component 918b may then notify, at 936, component 916b so that the component 916b can execute an appropriate timing correction.

Conventional systems (such as system 900 shown in FIG. 9) are not capable of providing reporting of time/synchronization events/changes/states to DU in real-time. However, timing accuracy is important for providing real time feedback from RU to DU in connection with any timing/synchronization events/changes/etc. (e.g., RU moving out of locked state (holdover state) due to significant Packet Delay Variation (PDV) in network, PTP grandmaster (GM) clock quality being corrupt, SyncE clock quality being corrupt and/or upstream master becoming unreachable, etc.)). It is also important for accurately timestamping data packets, generation/handling of various PTP events and/or messages, timing event changes, etc. Moreover, such timing accuracy is central for the purposes of immediate reporting from RU to DU that should be handled in real-time manner. However, the conventional systems that employ NETCONF/YANG protocol are not capable of doing because such systems employ application based reporting, where any time/synchronization/state event detected in hardware (e.g., PTP 920) is communicated to software layers (e.g., components 916, 918) that employ NETCONF/YANG protocol for reporting from RU to DU, as discussed above with regard TO FIG. 9. Because of the dependency on the application layer, the reporting process becomes complex, time-consuming, and is not performed in real-time (this can be especially troublesome in scenarios where there are series of PTP state changes), which typically leads DU to process old or "stale" data of RU. Not being able to report in real-time about RU status to DU may also lead to unexpected/undefined results. For example, DU might not want the RU to radiate upon RU moving to holdover (due to a high offset). Further, any delay in providing this information to DU may eventually lead to call handover issues, delays, and other issues.

The current subject matter resolves the above issues through us of the radio synchronous messaging protocol described below. In particular, the current subject matter can be configured to provide a communication protocol between the DU and the RU that can occur in real-time at Layer 2. The current subject matter can be configured to implement a Layer 2 fast path mechanism using a predefined destination multicast address, a predefined protocol type, various time synchronization data types, payload options (where, for example, payload can vary based on a type of data exchange), and any combination thereof.

Figure 10:
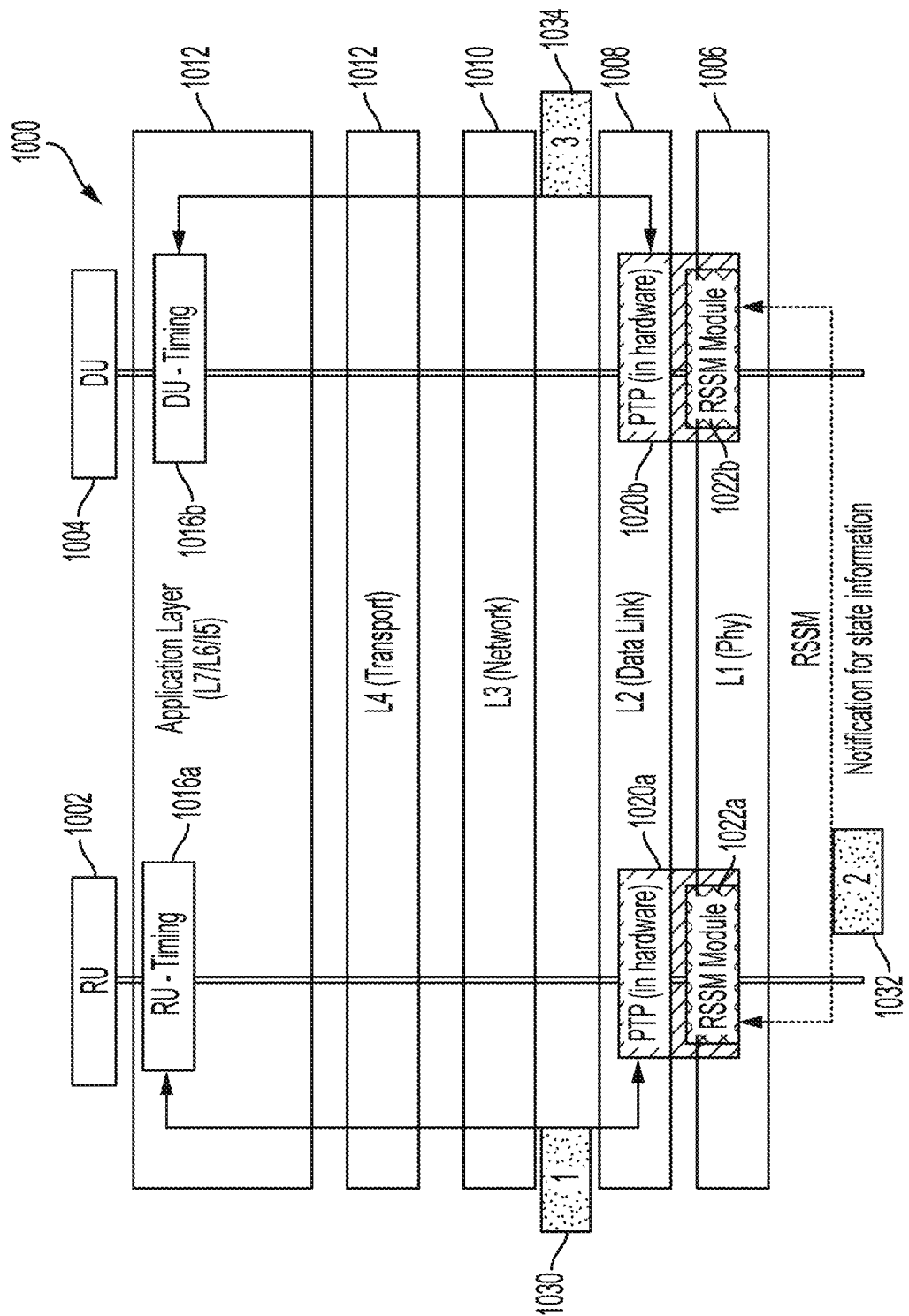
FIG. 10 illustrates an exemplary communication system that can be configured to implement the radio synchronous messaging protocol, according to some implementations of the current subject matter.

FIG. 10 illustrates an exemplary communication system 1000 that can be configured to implement the radio synchronous messaging protocol, according to some implementations of the current subject matter. The system 1000 can include a remote unit (RU) 1002 and a distributed unit (DU) 1004. Similar to FIG. 9, communication between RU 1002 and DU 1004 can be performed using various layers. The layers can include Layer 1 (PHY) 1006, Layer 2 (data link) 1008, Layer 3 (network) 1010, Layer 4 (transport) 1012, and an application layer (e.g., Layers 5-7).

In system 1000, the application layer 1014 can be configured to incorporate timing/synchronization components 1016, where the RU 1002 can include component 1016a and the DU 1004 can include component 1016b. Components 1016a and 1016b can be configured to be communicatively coupled to the precision time protocol aware components 1020a, 1020b, respectively, that can be incorporated into hardware of Layer 1/Layer 2, as shown in FIG. 10. Further, each PTP component 1020 can include a respective radio synchronous status messaging module (RSSM module) 1022 (a, b). Modules 1022 of the RU 1002 and DU 1004 can be communicatively coupled, as shown in FIG. 10.

The system 1000 can be configured to operate as follows. A timing state change event 1030 (e.g., a transition to holdover state due to clock class change event) may be detected in the hardware component 1020 (e.g., component 1020a). The event's 1030 information may be transmitted to the software component 1016a and also provided to the RSSM module 1022a. The RSSM module 1022, via Layer 2 message, can then communicate, at 1032, a notification for state change information to the RSSM module 1022b of the DU 1004. The component 1020b may then transmit the information received by the RSSM module 1022b and transmit a notification 1034 to the component 1016b so that the component 1016b can execute an appropriate timing correction and/or any other function in the portion of the application layer 1012 of the DU 1004.

Further, in any RU 1002 to DU 1004 communications, for any time synchronization/state/event changes, a Layer 2 frame having a predefined protocol type (e.g., RSSM protocol, as will be discussed below) can be generated and can be configured to include a type of data to report (e.g., PTP clock class change, etc.). The frame can also include different time synchronization/state/event data types (e.g., RSSM message types, as will be discussed below), source and/or destination information, optional payload information, and/or any other information. Source information (e.g., Source_Info) can be used to identify a source of data packet origination and can include a source type (e.g., Source_Type) and a source identifier (e.g., Source_id). Source_Type can be further configured to identify whether the message is transmitted from the RU or the DU. Source_Id can indicate a remote unit identifier (e.g., RU_ID) that can be used to identify a specific RU in a plurality of RUs that may be connected to the DU. Destination information (e.g., Destination_Info) can be used to identify destination and can have a destination type (e.g., Destination_Type) that can identify a particular DU and/or RU, and a destination identifier (e.g., Dest_Id) that can identify a particular DU and/or RU (if it is the DU, the its destination identifier can be DU_ID). Table 1 below illustrates an exemplary Ethernet frame format, in accordance with the discussion above) that can be transmitted between the modules 1022a and 1022b (as shown in FIG. 10).

TABLE 1

Ethernet frame format.

| PREAMBLE | DST_MC_MAC_ADDR | SRC_MAC_ADDR | ETHER_TYPE | PAYLOAD | FCS |
|---|---|---|---|---|---|
| 8 bytes | 6 bytes | 6 bytes | 2 bytes | (RSSM protocol message) | 4 bytes |

In the exemplary Ethernet frame format shown in Table 1, DST_MC_MAC_ADDR field can refer to a predefined multicast MAC address. The SRC_MAC_ADDR field can refer to the MAC address of Layer 2 source (e.g., RU being the source). The ETHER_TYPE field can refer to Layer 2 protocol Ether type that can indicate a type of frame being transmitted. The PAYLOAD field of the frame can include information relating to time synchronization/state/event that has been detected. In particular, the PAYLOAD field can include RSSM protocol message shown in Table 2 below. The PREAMBLE and FCS (frame check sequence) fields of the above Ethernet frame can refer to standard components of an Ethernet frame. Each of the above portions of this Ethernet frame can have various sizes (some of which may be typical of a standard Ethernet frame). As stated above, Table 2 illustrates an exemplary RSSM protocol message format.

include, based on each RSSM_MSG_TYPE above, relevant data relating to the any changes in the synchronization/time/status changes. For example, upon RU 1002 moving to a HOLDOVER state due to PTP clock class change, RU 1004 can generate a Layer 2 frame in accordance with formats shown in Tables 1-4 above and inform DU 1002 about the RU 1004 changes in status. In particular, the Ethernet frame shown in Table 1 can include the following information in its fields. DST_MC_MAC_ADDR can refer to the DU 1004's MAC address. The SRC_MAC_ADDR can refer to the MAC address of RU 1002. The ETHER_TYPE can include RSSM protocol type that can indicate that RSSM protocol frame is being transmitted. The PAYLOAD portion can be defined in accordance with Tables 2-4 above. It can include DST_IDENTIFIER (e.g., an identifier of the DU 1004), SRC_IDENTIFIER (e.g., an identifier of the RU 1002), RSSM_MSG_TYPE message type (e.g., PTP Clock

TABLE 2

RSSM protocol message.

| VersionRSSM(3 bits):Reserved(5 bits) 1 byte | DST_IDENTIFIER 3 bytes | SRC_IDENTIFIER 3 bytes | RSSM_MSG_TYPE 1 bytes | Length 2 byte | Payload |
|---|---|---|---|---|---|

As shown in Table 2 above, the VersionRSSM can be a field (e.g., 3 bits) indicating RSSM protocol version. The DST_IDENTIFIER field can include information about destination types and destination identifiers. In particular, it can include the following two fields Destination Type (DU/RU) and Destination_Id, as shown by the Table 3 below.

TABLE 3

Destination information fields.

| Destination_Type(1 byte) | Destination Identifier(2 bytes) |
|---|---|

Similarly, the SRC_IDENTIFIER field can include information about source types and source identifiers. In particular, it can include the following two fields Source Type (DU/RU) and Source_Id, as shown by the Table 4 below.

TABLE 4

Source information fields.

| Source_Type(1 byte) | Source Identifier(2 bytes) |
|---|---|

Referring back to Table 2, the RSSM_MSG_TYPE field can indicate a type of RSSM message being transmitted. Some exemplary RSSM message types can include at least one of the following: 0—UNDEFINED, 1—PTP_CLOCK_STATUS (e.g., which can be used to indicate the PTP lock status), 2-SYNCE_CLOCK_STATUS (e.g., which can be used to indicate SyncE lock status), 3—TIME_ERR_STATUS (e.g., which can be used to indicate phase/frequency error/offsets), 4—PTP_CFG (e.g., which can refer to PTP configuration, e.g., offset threshold to be configured on RU), 5—SYNCE_CFG (e.g., which can refer to frequency configuration, e.g., offset threshold to be configured on RU), 6—Optional cmd/config, and 7—255—Reserved for various uses.

The Length field of the RSSM message may be indicative of the length (e.g., in bytes) of the RSSM message, including the header and payload portion. The Payload field may Status Message), and an optional RSSM payload. Further, the DST_IDENTIFIER can include DU's 1004 Destination_Type and Destination_Identifier as DU_ID (e.g., DU's 1004) identifier that can be indicative of the message's destination. Further, the SRC_IDENTIFIER can include RU's 1002 Source_Type (e.g., RU) and Source_Identifier as RU_ID corresponding to the origin (i.e., RU 1002) of the message. The RSSM_MSG_TYPE field of the message can indicate that the message is a PTP clock status message. The Payload field of the RSSM message can be as follows:

PTP lock status: LOCKED/HOLDOVER/FREE-RUN (e.g., can indicate PTP status)

State since (in seconds): xx (e.g., can indicate time since the last change of status)

PTP Received Clock Quality: 7 (e.g., this value can include any value from 1-255)

GM Info (GM Clk id): 64 byte value (e.g., can be indicative of grandmaster clock information and its clock identifier)

Using the above information, the RSSM module 1022a in the RU 1002 can be configure to generate a RSSM message 1032 and transmit it to the RSSM module 1022b in the DU 1004. Based on the received message, the DU 1004 can be configured to selectively control/monitor/configure RU 1002 for any further actions.

Similarly, communications from DU 1004 to RU 1002 can also implement the Layer 2 Ethernet frame described above with regard to Tables 1-4. In particular, for any time synchronization configurations, DU 1004 can generate a Layer 2 frame (e.g., as shown in Table 1) having a predefined protocol type (e.g., RSSM protocol) and data for reporting, configuration, etc. (e.g., phase/frequency threshold to be configured on RU 1002). For transmission of RSSM messages from DU 1004 to RU 1002, a different time synchronization event data types (e.g., RSSM message types), source and destination information and optional payload information can be used (e.g., different than those being used in the Ethernet frame being transmitted from RU 1002 to DU 1004). For example, DU 1004 would like RU 1002 to be configured with a specific phase/frequency threshold, such that RU 1002 can continue to stay locked and radiate as long as phase/frequency error is within the configured phase/frequency threshold. To do so, DU 1004 can be configured to generate a Layer 2 Ethernet frame (as defined in Tables 1-4 above) using the following information and transmit it to RU 1002 for configuring the intended values.

In particular, the Ethernet frame shown in Table 1 can include the following information in its fields. DST_MC_MAC_ADDR can refer to the RU 1002's MAC address. The SRC_MAC_ADDR can refer to the MAC address of DU 1004. The ETHER_TYPE can include RSSM protocol type that can indicate that RSSM protocol frame is being transmitted. The PAYLOAD portion can be defined in accordance with Tables 2-4 above. It can include DST_IDENTIFIER (e.g., an identifier of the RU 1002), SRC_IDENTIFIER (e.g., an identifier of the DU 1004), RSSM_MSG_TYPE message type (e.g., phase/frequency thresholds configuration message), and an optional RSSM payload. Further, the DST_IDENTIFIER can include RU's 1002 Destination_Type and Destination_Identifier as RU_ID (e.g., RU's 1002) identifier that can be indicative of the message's destination. Further, the SRC_IDENTIFIER can include DU's 1004 Source_Type (i.e., DU) and Source_Identifier as DU_ID corresponding to the origin (i.e., DU 1004) of the message. The RSSM_MSG_TYPE field of the message can indicate that the message is a PTP_CFG configuration message. The Payload field of the RSSM message can be as follows:

Clock Class: Configurable clock class threshold
Phase_Offset_cfg: Configurable phase offset threshold (e.g., 100 ns)
Freq_Offset_cfg: Configurable frequency offset threshold in ppm (e.g., 11 ppm)
Optional payload can also be added.

As stated above, using the above data, DU 1004 can generate the Layer 2 Ethernet message destined RU 1002 so that the intended configuration can be applied on RU 1002 using the contents transmitted in generated RSSM message.

In some implementations, in a disaggregated RAN architecture, one or more DUs 1004 can be communicatively coupled to a single RU 1002 and/or one or more RUs 1002 can be communicatively coupled to a single DU 1004. In an operation, the RU 1002 can be configured to be synchronized (e.g., in time/frequency, etc.) and the DU 1004 can be configured to monitor the RU 1002 time synchronization status by programming the RU 1002 to report the synchronization status to the connected DUs 1004 using the RSSM protocol mechanism. The reporting may be automatic, periodic, manual, upon receiving an appropriate request, and/or executed at any other desired times and/or periodicity. For example, the rate/frequency at which such reporting to DU 1004 occurs can be programmed.

Each RU 1002 can be configured to report time synchronization status to the DU 1004 be generating a Layer 2 Ethernet frame (in accordance with Tables 1-4 above). The frame can include PTP module 1020a data, where the PTP module functionality can be implemented in hardware, software, and/or both. As shown in FIG. 10 and discussed above, the PTP module 1020a can incorporate a RSSM protocol module 1022a functions and/or procedures.

In the event of a change of status in the RU 1002 (e.g., RU 1002 losing lock/synchronization status and moving to HOLDOVER/FREE-RUN from LOCKED/SYNCED status, for example, due to loss of S-plane communication on RU/PTP clock class not being within an acceptable range, SyncE SSM quality being above a permissible range etc.), its PTP module 1020a can be configured to detect such change and provide an appropriate notification to the RSSM module 1022a, where the notification can include data indicative of the change in lock status along with lock status data. RSSM module 1022a can use the received information to determine the type of indication/event and generate a Layer 2 Ethernet frame message in accordance with Tables 1-4 above. The RSSM module 1022a can then transmit the generated message to all upstream DUs 1004 that may be communicatively coupled to the RU 1002.

The DU's 1004 built-in PTP modules 1020 integrating the RSSM modules 1022 can be configured to detect the received Layer 2 Ethernet message and determine the time synchronization state changes. The DUs 1004 can then determine, based on the received information, whether to react to such changes. The reaction can be in a real-time manner. The DU 1004's RSSM module 1022b can generate an appropriate RSSM message for inclusion in a Layer 2 Ethernet frame (generated in accordance with Tables 1-4 above) and transmit it to all the relevant DUs 1002 that can be communicatively coupled to the RU 1002.

The above detections, reactions, and notifications (by DU/RU) of time state change can occur within hardware portions of the DU/RU (e.g., close to the "wire"). Thus, these processes can avoid any software module interactions that may occur in higher Layers and hence, avoid delays in reporting time sensitive events to DUs that may be associated with software Layers. Hence, the communications between DU and RU can be substantially in real-time.

Further, in some implementations, RUs reporting lock status to DUs can be configured to select a predefined multicast address as the destination MAC address. This can avoid keeping track of all unicast DUs to which a particular RU can be communicatively coupled as well as generating multiple lock status reports with unicast destination MAC addresses. Instead, one multicast destination MAC address RSSM frame can be replicated and simultaneously transmitted to all the upstream DUs. This can ensure that the RU status is broadcasted to all multicast DUs in real-time so that DUs can timely execute appropriate actions to enabling/disabling radio frequency (RF) features prior to RUs introducing delays (e.g., which can lead to call drops/call delays, etc.).

Figure 11:
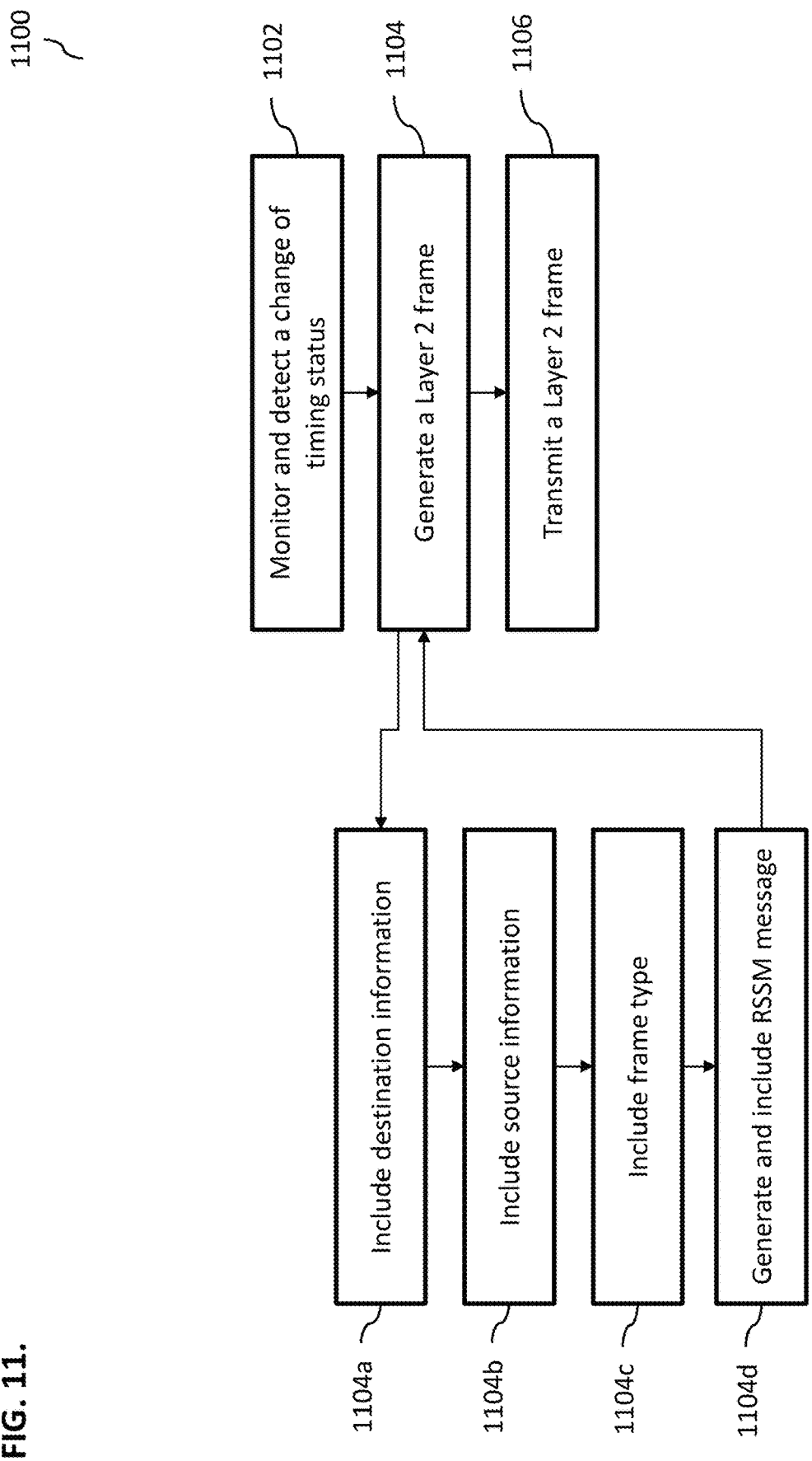
FIG. 11 illustrates an exemplary process 1100 for radio synchronous messaging, according to some implementations of the current subject matter.

FIG. 11 illustrates an exemplary process 1100 for radio synchronous messaging, according to some implementations of the current subject matter. The process 1100 can be performed by the system 1000 shown in FIG. 10. At 1102, a change of timing status (e.g., a change in synchronization state, a timing change event, PTP clock class change, phase/frequency threshold change, etc.) may be monitored and detected. The change in timing status can be monitored/detected by a distributed unit (DU) 1004 and/or a radio unit (RU) 1002, as shown in FIG. 10. In particular, the PTP module 1020 can be configured to detect such change.

At 1104, a Layer 2 can be generated (e.g., by the RU for a communication from RU to DU; by the DU for a communication from DU to RU). The Layer 2 frame can include a source and destination data/information along with payload information that can include a RSSM message. The source data/information can include a source type, a source identifier, etc., at 1104a (e.g., identifying, DU and/or RU) and the destination data/information can include a destination type, a destination identifier, etc., at 1104b (e.g., identifying RU and/or DU). The frame can also include an Ether type specifically identifying the type of this frame as communicating changes in synchronization state, a timing change event, etc., at 1104c. The Layer 2 frame can also include a RSSM message that can be indicative of the changes that have been detected, as discussed above, at 1104d.

At 1106, the generated Layer 2 frame can be transmitted to all applicable or "relevant" communications units, (e.g., RU, DU, etc.). Transmission to all applicable or "relevant" communications units can be accomplished through use of a multicast MAC addressing, whereby the generated frame can be replicated with multiple copies and transmitted. The Layer 2 frame can be received by the PTP hardware (and in particular, the RSSM module 1022) of the intended recipient of the frame (e.g., DU 1004 if the frame is transmitted by the RU 1002, as shown in FIG. 10).

Some of the advantages of the current subject matter over the existing systems include an ability to use a multicast-based communications between the DUs and RUs (as opposed to conventional protocols that implement unicast communications), thereby eliminating a need for individual message communication between DUs and RUs. Further, as stated above, the current subject matter enables substantially real-time detection of changes, as well as generation and reporting of RSSM messages to DUs (as compared to conventional systems that typically consume up to approximately 1 second from the time an event is detected to generating a message and reporting to DU from RU. Additionally, conventional systems typically provide a generic mechanism for exchanging information between DU and RU for all type of events/notifications (e.g., S-plane, U-plane, C-plane), whereas the current subject matter's RSSM protocol can define an explicit communications method for exchanging time synchronization status (e.g., S-plane), configuring time synchronization thresholds/parameters between DU and DU, as may be desired by telecommunications operators.

Referring back to Table 2, below is a discussion of some exemplary formats of various RSSM_MSG_TYPE fields that can be indicative of a type of RSSM message being transmitted (e.g., 0—UNDEFINED, 1—PTP_CLOCK_STATUS, 2—SYNCE_CLOCK_STATUS, 3—TIME_ERR_STATUS, 4—PTP_CFG, 5—SYNCE_CFG, 6—Optional cmd/config, and 7—255—Reserved for various uses). The type of the RSSM message (as shown in Table 2 above) can determine specific data that can be included in the payload.

In some exemplary implementations, the PTP_CLOCK_STATUS message can have the following format, as shown in Table 5 below.

TABLE 5

| PTP_CLOCK_STATUS message. | | | | | | |
|---|---|---|---|---|---|---|
| RSSM_MSG_TYPE = PTP_CLOCk_STATUS(1) 1 byte | N 1 byte | PTP_LOCK_STATUS 1 byte | State_Since (in seconds) 10 bytes | Clock_Class 4 bytes | GM Id 8 bytes | Extensible payload |

The above message can indicate that the RSSM message type is the PTO clock status (e.g., RSSM_MSG_TYPE=PTP_CLOCK_STATUS(1)). It can also include an indicator of a length of RSSM message header and payload in bytes (e.g., N). Further, the PTP lock status can be indicative of a timing state of the RU and/or DU (e.g., PTP_Lock_Status=Timing State of RU/DU). By way of a non-limiting example, some of the PTP_Lock_Status values can include LOCKED, HOLDOVER, FREE-RUN, etc. Another field in the above message can include an indicator of a time of how long a particular DU/RU has been in the present lock state (e.g., State_Since; in seconds). The Clock_Class field can be indicative of a clock class that can be received from upstream master (e.g., grandmaster clock class). The GM Id field can be indicative of a grandmaster identifier which can be received and selected as per best master clock algorithm (BMCA) among other available grandmasters. The Extensible Payload field can include any additional data.

The SYNCE_CLOCK_STATUS message (e.g., type 2 of the RSSM message) can have the following format, as shown in Table 6.

TABLE 6

| SYNCE_CLOCK_STATUS Message. | | | | | |
|---|---|---|---|---|---|
| RSSM_MSG_TYPE = SYNCE_CLOCK_STATUS(2) 1 byte | N 2 bytes | SyncE_Lock_Status 1 byte | State_Since (in seconds) 10 bytes | Received_SSM_Level 1 byte | Extensible Payload |

The first two fields of this message can be similar to the message shown in Table 5. The SyncE_Lock_Status field can be indicative of SyncE lock status of RU/DU. Some exemplary, non-limiting, values can include LOCKED, HOLDOVER, FREE-RUN, etc. State_Since field is similar to the respective field shown in Table 5 above. The Received_SSM_Level field can indicate a received SSM quality indicating a physical clock quality level. The Extensible Payload can, similar to Table 5, include any additional data.

The TIME_ERR_STATUS message can have the following format, as shown in Table 7.

TABLE 7

| TIME_ERR_STATUS message. | | | | |
|---|---|---|---|---|
| RSSM_MSG_TYPE = TIME_ERR_STATUS(3) 1 byte | N 2 bytes | TIME_ERR(in ns) 10 bytes | FREQ_ERR(in ppb). 10 bytes | Extensible Payload |

The first two fields of the above message (containing respective information) are similar to the fields in Tables 5 and 6, discussed above. In particular, the RSSM_MSG_TYPE field can include a time error (e.g., offset) status of the device (e.g., TIME_ERR_STATUS). N field can, as stated above, correspond to the length of RSSM message header and payload. The TIME_ERR field (as measured in nanoseconds) can correspond to the time error (e.g., phase offset) accumulated on the device (e.g., RU, DU, etc.)). The FREQ_ERR can correspond to the frequency error (e.g., Offset) accumulated on the device (e.g., as measured in ppm). The payload can include any further information.

The PTP configuration message (i.e., PTP_CFG) can have the following format shown in Table 8.

TABLE 8

| PTP configuration message. | | | | | |
|---|---|---|---|---|---|
| RSSM_MSG_TYPE = PTP_CFG(4) 1 byte | N 2 bytes | PTP Clock Class 4 bytes | PHASE_OFFSET_CFG (in ns) 10 bytes | FREQ_OFFSET_CFG (in ppb). 10 bytes | Extensible Payload |

The first two fields contain the type of information discussed above with regard Tables 5-7. The PTP_Clock_Class field can correspond to a configurable clock class value (e.g., 1-255). The PHASE_OFFSET_CFG field can include a configurable phase offset value (e.g., as measured in ns). The FREQ_OFFSET_CFG field can include a configurable frequency offset value (e.g., as measured in ppm). Again, the payload field can include any other information.

The SyncE configuration message (e.g., SYNCE_CFG) can have the following format as shown in Table 9 below.

TABLE 9

| SyncE configuration message. | | | | |
|---|---|---|---|---|
| RSSM_MSG_TYPE = SYNCE_CFG(5) 1 byte | N 2 bytes | SSM_CLK_LEVEL 1 byte | FREQ_OFFSET_CFG (in ppb). 10 bytes | Extensible Payload |

In addition to the fields already discussed with regard to Tables 5-9, the SSM_CLK_LEVEL field can include information about configurable SSM quality level. The FREQ_OFFSET_CFG field can include data relating to configurable frequency offset (as measured in ppb). Lastly, the payload can include any additional data.

Figure 12:
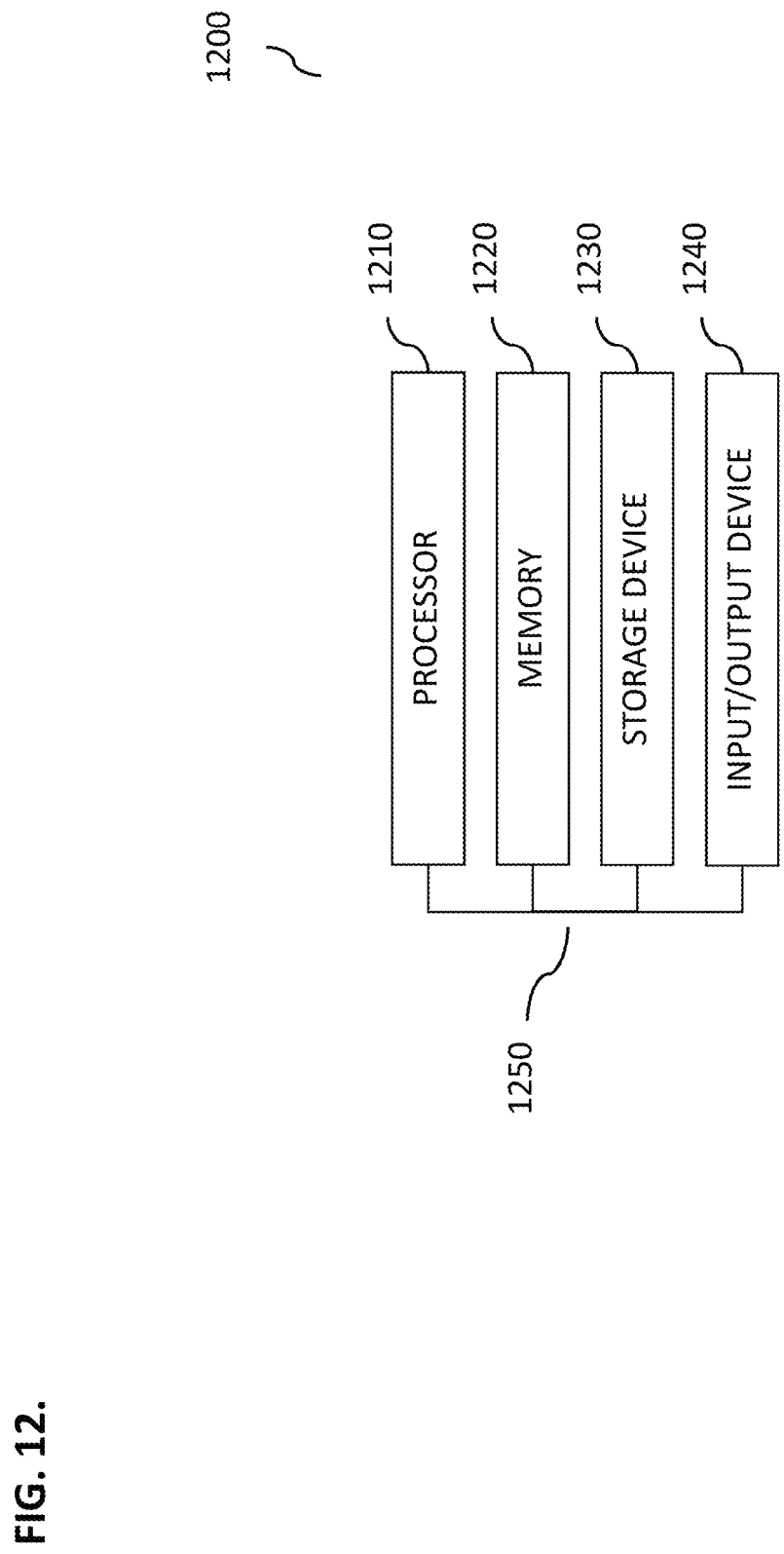
FIG. 12 illustrates an exemplary system, according to some implementations of the current subject matter.

In some implementations, the current subject matter can be configured to be implemented in a system 1200, as shown in FIG. 12. The system 1200 can include one or more of a processor 1210, a memory 1220, a storage device 1230, and an input/output device 1240. Each of the components 1210, 1220, 1230 and 1240 can be interconnected using a system bus 1250. The processor 1210 can be configured to process instructions for execution within the system 600. In some implementations, the processor 1210 can be a single-threaded processor. In alternate implementations, the processor 1210 can be a multi-threaded processor. The processor 1210 can be further configured to process instructions stored in the memory 1220 or on the storage device 1230, including receiving or sending information through the input/output device 1240. The memory 1220 can store information within the system 1200. In some implementations, the memory 1220 can be a computer-readable medium. In alternate implementations, the memory 1220 can be a volatile memory unit. In yet some implementations, the memory 1220 can be a non-volatile memory unit. The storage device 1230 can be capable of providing mass storage for the system 1200. In some implementations, the storage device 1230 can be a computer-readable medium. In alternate implementations, the storage device 1230 can be a floppy disk device, a hard disk device, an optical disk device, a tape device, non-volatile solid state memory, or any other type of storage device. The input/output device 1240 can be configured to provide input/output operations for the system 1200. In some implementations, the input/output device 1240 can include a keyboard and/or pointing device. In alternate implementations, the input/output device 1240 can include a display unit for displaying graphical user interfaces.

Figure 13:
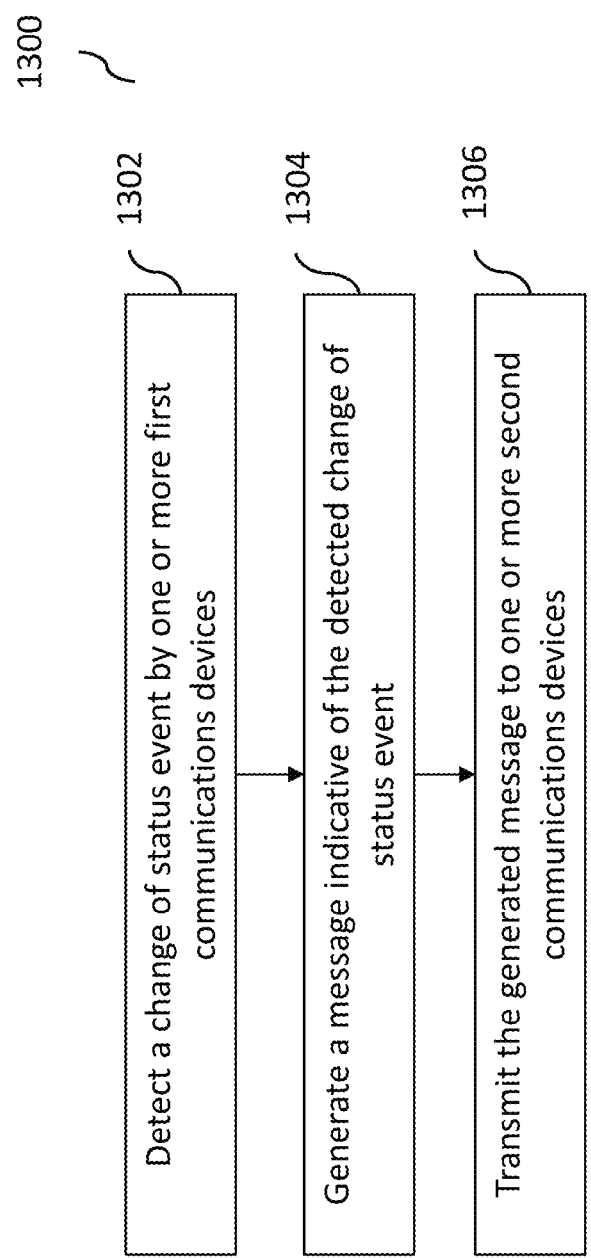
FIG. 13 illustrates an exemplary method, according to some implementations of the current subject matter.

FIG. 13 illustrates an exemplary method 1300, according to some implementations of the current subject matter. At

1302, a change of status event can be detected by one or more first communications devices (e.g., RU, DU, etc.). At 1304, a message indicative of the detected change of status event can be generated. At 1306, the generated message can be transmitted to one or more second communications devices (e.g., DU, RU, etc.).

In some implementations, the current subject matter can include one or more of the following optional features. The communications devices can include at least one of the following: a base station, a gNodeB base station, an eNodeB base station, and any combination thereof. In particular, the communications devices can include at least one of the following: one or more distributed units, one or more radio units, and any combinations thereof. Further, in some implementations, the remote units can generate the message and transmit the generated message to the one or more distributed units. Alternatively, or in addition to, the distributed units can generate the message and transmit the generated message to the one or more remote units.

In some implementations, the message can be a Layer 2 message frame configured to be transmitted from one or more Layer 2 components of the one or more first communications devices to one or more Layer 2 components of the one or more second communications devices. The Layer 2 message can include at least one of the following: an identification of a source of the Layer 2 message, an identification of a type of the source of the Layer 2 message, an identification of a destination of the Layer 2 message, an identification of a type of the destination of the Layer 2 message, an identification of a type of the Layer 2 message, a data corresponding to the change of status event, and any combination thereof. Further, the data corresponding to the change of status event can include at least one of the following: a precision timing protocol clock status, a synchronous Ethernet clock status, a time error status, a precision timing protocol configuration, a synchronous Ethernet configuration, one or more commands, one or more configurations, and any combination thereof. The data corresponding to the change of status event can include at least one of the following: a time elapsed since a detection of a previous change of status event, a phase offset configuration, a frequency offset configuration, and any combination thereof.

In some implementations, the method can include executing, by the second communications devices, one or more actions based on the received message.

In some implementations, the message can be a multicast message configured to be received by the one or more second communication devices in substantially real time.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A method in a radio access network (RAN), the method comprising following steps of at least one of Layer 1 or Layer 2, executed in a first communications device in the RAN:
   detecting at least one event of a plurality of events;
   generating a notification regarding the at least one event of the plurality of events by including an identifier corresponding to the detected event based on a designated protocol that defines a unique identifier for each of the plurality of events; and
   sending the notification to a second communications device in the RAN to trigger the second communications device to execute an action corresponding to the event identified by the identifier,
   wherein the plurality of events includes a first event related to Precision Time Protocol or Synchronous Ethernet, and
   wherein the sending comprises sending a notification regarding the first event to the second communications device to trigger the second communications device to execute an action corresponding to the first event.

2. The method of claim 1, wherein the first communications device includes a distributed unit, and the second communications device includes a radio unit.

3. The method of claim 1, wherein the first communications device includes a radio unit, and the second communications device includes a distributed unit.

4. The method of claim 1, wherein the generating occur without including information made in an Application Layer of the first communications device in response to the detecting.

5. The method of claim 1, wherein the notification includes a multicast message;
   the second communications device includes a plurality of communications devices each configured to simultaneously receive the notification from the first communications device; and
   the sending comprises sending, simultaneously, the notification to the plurality of communication devices.

6. The method of claim 1, wherein the second communications device includes a single device.

7. The method of claim 1, wherein the event includes a change of synchronization state of the first communications device.

8. The method of claim 1, wherein the plurality of events includes an event related to at least one of the following:
   a precision timing protocol clock status, a synchronous Ethernet clock status, a time error status, a precision timing protocol configuration, a synchronous Ethernet configuration, one or more commands, one or more configurations, and any combination thereof.

9. The method of claim 1, further comprising
   sending information regarding the detected event to an Application Layer of the first communications device;
   wherein the information triggers an action in the Application Layer related to the action triggered by the notification.

10. The method of claim 1, wherein:
    the plurality of events include a second event not related to the first protocol; and
    the notification is generated when the first event is detected and also when the second event is detected.

11. The method of claim 10, wherein:
    the first event is related to Precision Time Protocol; and
    the second event is related to Synchronous Ethernet.

12. A first communications device in a radio access network (RAN) comprising:
    at least one programmable processor; and
    a non-transitory machine-readable medium storing instructions that, when executed by the at least one programmable processor, cause the at least one programmable processor to perform following steps of at least one of Layer 1 or Layer 2:
    detecting at least one event of a plurality of events;
    generating a notification regarding the at least one event of the plurality of events by including an identifier corresponding to the detected event based on a designated protocol that defines a unique identifier for each of the plurality of events; and
    sending the notification to a second communications device in the RAN to trigger the second communications device to execute an action corresponding to the event identified by the identifier,
    wherein the plurality of events includes a first event related to Precision Time Protocol or Synchronous Ethernet, and
    wherein the sending comprises sending a notification regarding the first event to the second communications device to trigger the second communications device to execute an action corresponding to the first event.

13. The first communications device of claim 12, wherein the first communications device includes a distributed unit, and the second communications device includes a radio unit.

14. The first communications device of claim 12, wherein the first communications device includes a radio unit, and the second communications device includes a distributed unit.

15. The first communications device of claim 12, wherein the generating occurs without including information made in an Application Layer of the first communications device in response to the detecting.

16. The first communications device of claim 12, wherein:
the notification includes a multicast message;
the second communications device includes a plurality of communications devices each configured to simultaneously receive the notification from the first communications device; and
the sending comprises sending, simultaneously, the notification to the plurality of communication devices.

17. The first communications device of claim 12, wherein the second communications device includes a single device.

18. The first communications device of claim 12, wherein the event includes a change of synchronization state of the first communications device.

19. The first communications device of claim 12, wherein the plurality of events includes an event related to at least one of the following:
a precision timing protocol clock status, a synchronous Ethernet clock status, a time error status, a precision timing protocol configuration, a synchronous Ethernet configuration, one or more commands, one or more configurations, and any combination thereof.

20. The first communications device of claim 12, wherein the at least one programmable processor further performs
sending information regarding the detected event to an Application Layer of the first communications device; and
wherein the information triggers an action in the Application Layer related to the action triggered by the notification.

21. The first communications device of claim 12, wherein:
the plurality of events include a second event not related to the first protocol; and
the notification is generated when the first event is detected and also when the second event is detected.

22. The method of claim 21, wherein:
the first event is related to Precision Time Protocol; and
the second event is related to Synchronous Ethernet.

* * * * *